United States Patent
Bradley et al.

(10) Patent No.: US 7,711,574 B1
(45) Date of Patent: May 4, 2010

(54) SYSTEM AND METHOD FOR PROVIDING AUTOMATED VALUE ESTIMATES OF PROPERTIES AS OF A SPECIFIED PREVIOUS TIME PERIOD

(75) Inventors: Michael G. Bradley, Chesterfield, MO (US); J. Douglas Gordon, Arlington, VA (US); Pamela W. Sims, North Arlington, VA (US); Douglas A. McManus, Bethesda, MD (US); Morgan C. Snyder, Clifton, VA (US); Mathew J. Klena, Falls Church, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 1643 days.

(21) Appl. No.: 10/679,516

(22) Filed: Oct. 7, 2003

Related U.S. Application Data

(63) Continuation-in-part of application No. 10/094,806, filed on Mar. 12, 2002.

(60) Provisional application No. 60/311,125, filed on Aug. 10, 2001.

(51) Int. Cl.
*G06Q 10/00* (2006.01)
(52) U.S. Cl. .......................... 705/1; 705/10
(58) Field of Classification Search .................. 705/1, 705/10
See application file for complete search history.

(56) References Cited

U.S. PATENT DOCUMENTS

| 5,361,201 | A | 11/1994 | Jost et al. | |
|---|---|---|---|---|
| 5,611,052 | A | 3/1997 | Dykstra et al. | |
| 5,857,174 | A | 1/1999 | Dugan | 705/1 |
| 5,930,776 | A | 7/1999 | Dykstra et al. | |
| 5,940,812 | A | 8/1999 | Tengel et al. | |
| 6,014,645 | A | 1/2000 | Cunningham | |
| 6,088,686 | A | 7/2000 | Walker et al. | |
| 6,112,190 | A | 8/2000 | Fletcher et al. | |
| 6,253,186 | B1 | 6/2001 | Pendleton, Jr. | |
| 6,324,524 | B1 | 11/2001 | Lent et al. | |
| 6,330,546 | B1 | 12/2001 | Gopinathan et al. | |
| 6,401,070 | B1 | 6/2002 | McManus et al. | 705/1 |

(Continued)

FOREIGN PATENT DOCUMENTS

JP 59216265 12/1984

(Continued)

OTHER PUBLICATIONS

Information on Realtor Workstation, 2000.*

(Continued)

*Primary Examiner*—Naresh Vig
(74) *Attorney, Agent, or Firm*—Finnegan, Henderson, Farabow, Garrett & Dunner L.L.P.

(57) ABSTRACT

Systems and methods are provided for providing, based on a model, an indication that an appraisal value for a property is likely to be faulty. In one embodiment, a method includes receiving information representative of at least one of a borrower, a property, or one or more demographics, such that the received information corresponds to a date. The method determines a score based on the received information and the model, such that the score provides the indication of the likelihood that the appraisal value was faulty on the date.

18 Claims, 17 Drawing Sheets

U.S. PATENT DOCUMENTS

| | | | |
|---|---|---|---|
| 6,516,056 | B1 | 2/2003 | Justice et al. |
| 6,567,791 | B2 | 5/2003 | Lent et al. |
| 6,609,118 | B1 | 8/2003 | Khedkar et al. |
| 6,834,120 | B1 * | 12/2004 | LeClerc et al. .............. 382/170 |
| 7,107,241 | B1 | 9/2006 | Pinto |
| 7,236,952 | B1 | 6/2007 | D'Zmura |
| 7,289,965 | B1 * | 10/2007 | Bradley et al. ................. 705/1 |
| 2002/0007341 | A1 | 1/2002 | Lent et al. |
| 2002/0040339 | A1 | 4/2002 | Dhar et al. |
| 2002/0087389 | A1 * | 7/2002 | Sklarz et al. .................. 705/10 |
| 2002/0099649 | A1 | 7/2002 | Lee et al. |
| 2002/0133371 | A1 * | 9/2002 | Cole ............................. 705/1 |
| 2002/0194119 | A1 | 12/2002 | Wright et al. |
| 2003/0093366 | A1 | 5/2003 | Halper et al. |
| 2003/0120591 | A1 | 6/2003 | Birkhead et al. |
| 2007/0136187 | A1 | 6/2007 | Libman |

FOREIGN PATENT DOCUMENTS

| | | | |
|---|---|---|---|
| JP | 04052198 | A * | 2/1992 |
| JP | 2002312458 | A * | 10/2002 |

OTHER PUBLICATIONS

Dian Hymer, Credit Scoring Can Speed Up Loan Process, Apr. 28, 1996, The Santa Fe New Mexican, p. G.1.*

Robbins, Methodology for Evaluating, Ranking, and Pricing Mountainous Wilderness Lands, 1983, The University of Wisconsin.*

First American Real Estate Solutions Experiences Record Response to the Release of ValuePoint, Nov. 4, 2002, PR Newswire.*

Metropolitan Regional Information Systems labeled as MRIS, printed on Oct. 14, 2007, 1997-1998 data displayed.*

Lewis, Edward M., "An Introduction to Credit Scoring," Library of Congress Catalog No. 90-92258, pp. 1-169, 1994, San Rafael, CA.

Mary Dum, Why CASA for Fitch? American Banker-Bond Buyer, Thomson Publishing Corporation, vol. 9, No. 1, p. 36, Jan. 2002/Feb. 2002.

http://www.myfico.com/myfico/CreditCentral/ScoringWorks.asp, pp. 1-2, date visited Oct. 28, 2002.

http://www.myfico.com, p. 1, date visited Oct. 28, 2002.

U.S. Appl. No. 10/095,006, entitled "Systems and Methods for Generating a Model for Home Value Scoring," filed Mar. 12, 2002.

U.S. Appl. No. 10/283,339, entitled "Systems and Methods for Income Scoring," filed Oct. 30, 2002.

U.S. Appl. No. 10/283,338, entitled "Systems and Methods for Generating a Model for Income Scoring," filed Oct. 30, 2002.

D. Nichols, "Sample Letter," University of Georgia, Dec. 12, 1998.

DSStar, Paymentech Deploys eFalcon for Fraud Reduction Service (visited Nov. 9, 2006), <http://www.taborcommunications.com/dsstar/00/1024/102335.html).

FairIsaac, "Falcon Fraud Management Software—Customer Credit Card Fraud Protection," http://www.fairisaac.com/Fairisaac/Solutions/Product+Index/Falcon+Fraud+Manager.

H. Savage, "Lenders Ask for Tax Form," Washington Times, Jul. 7, 2000, p. F.10, Washington, D.C.

J.T. McClave et al., "A First Course in Business Statistics," Fifth Edition, 1992, pp. 521-593, MacMilian Publishing.

"Lenders Tap IRS to Check Income Info," New York Times, The Sacramento Bee,, Jan. 12, 1997, p. 1.3, Sacramento, California.

Louisiana State University, Department of Experimental Statistics Courses and Descriptions (visited Nov. 9, 2006), http://www.stat.lsu.edu>.

Netsavvy Communications, E-commerce News: CyberCash to Offer, "eFalcon," Fraud Detection Service (visited Nov. 9, 2006), HTTP://sellitontheweb.com/ezine/news0300.shtml>.

Patricia A. Murphy, "Fighting Internet Card Fraud," Jul. 2000.

Phillips Business Information Inc., "Security Pacific using ACAPs to Evaluate Credit and Speed up Loan Processing," Financial Services Reports, Apr. 17, 1991.

PR Newswire, "M&I Data Services and American Management Systems Announce Strategic Alliance to Provide Comprehensive Consumer Lending Solutions to Enhance Customer Relationships," Oct. 4, 1999.

PR Newswire, "Paymentech Deploys Efalcon for Fraud Reduction Service Within Existing Payment Transaction Process," Oct. 16, 2000.

Software Prototyping, http://nas.cl.uh.edu/helm/swen5231/PROTO_HTML/index.htm, Sep. 22, 1998, pp. 1-32.

S.Vinterbo et al., A Genetic Algorithm to Select Variables in Logistic Regression: Example in the Domain of Myocardial Infarction, 1999.

T. Cornwell, "Ocwen Puts Vendor Management on New 'Net Site," National Mortgage News, Oct. 16, 2000, p. 8, vol. 25, Iss. 4, New York.

The University of San Antonio, 2005-2007 Graduate Catalog Course Descriptions Computer Science (CS) (visited Nov. 3, 2006), http://www.utsa.edu/gcat/chapter7/cos/cs.cfm>.

Anonymous, "USDA's Subsidized-Meal-Program Certification to Undergo Review," Nation's Restaurant News, Oct. 21, 2002, p. 20, vol. 36, Issue 42, New York.

"What is Model & Modeling,"(visited Feb. 16, 2008), http://www.tiu.ac.jp/org/forum-01/index.files/Pages386.html.

* cited by examiner

| |
|---|
| Loan/Reference Number |
| Requestor (i.e., the lender) |
| Street Address of the property |
| City |
| State |
| ZIP code (5 digit) |
| Stated value of the property |
| Total loan amount (first lien plus additional) to calculate total loan-to-value (LTV). If unknown, enter '0' for all amounts |
| Condo Flag (a flag indicating whether the loan is for a condominium) |
| Purpose of loan (P=purchase, R=rate/term refinance (refi), C=cash out refinance, H=home improvement, D=debt consolidation, O=other) |
| Credit Source (1 for lender, 2 for Credit Repository) |
| Borrower's Credit Score(s) |

FIG. 6

| |
|---|
| Borrower's credit score(s) |
| ZIP code with +4 extension, if available, for a property |
| Combined Point Value is a home value estimate, such as an estimate from a database containing property estimates in a region, such as within a ZIP code, county, or state. |
| Combined Sigma is a standard deviation for home value estimates derived from a database containing property estimates in a region, such as within a ZIP code, county, or state. |
| Zone Point Value refers to a point value assigned to the median house price based on ZIP code or ZIP+4 code |

FIG. 7

Sample Web Page Request

Enter the address and click "Submit" to retrieve an HVSCORE report.

---
Top of Form 1

| | |
|---|---|
| Borrower First Name: | |
| Borrower Last Name: | |
| Loan/Ref #: | |
| Requestor: | |
| Street: | |
| Unit #: | _____ (optional) |
| City: | |
| State: | AK ▼ |
| Zip Code: | |

Current Purchase/Refinance/Credit Information:

| | | | |
|---|---|---|---|
| Current Appr/Value Estimate: | | First Lien Loan Amount: | |
| | | (if unknown, enter '0' for all amounts) | |
| Second Lien Loan Amount: | | Financial MI Amount: | |

Property Type:  [1] Single Family Residence  [2] Condo  [3] Two-Four Unit

Loan Purpose:  [1] Purchase  [2] Cash-out Refinance  [3] Non cash-out Refinance  [4] Home Improvement  [5] Debt Consolidation  [6] Other

Credit Source:  [1] Lender  [2] Credit Repository

Credit Score: _____

| Submit | Reset values |
|---|---|

Bottom of Form 1

---

Home

FIG. 8

| 1. | HV SCORE = 696.7000  \*** VARIABLES ARE MULTIPLIED BY **\ |
|---|---|
| 2. | + 1.1513*CS          \** parameters or weights **/ |
| 3. | + 0.7011*CS660 |
| 4. | - 1.4889*CS760 |
| 5. | + 816.3115*MCRED |
| 6. | - 11.0280*LTV |
| 7. | + 1.4715*LTV71 |
| 8. | + 1.1859*LTV81 |
| 9. | - 4.2848*LTV91 |
| 10. | -53.3393*CONDO |
| 11. | -34.6074*VALSIGU |
| 12. | +34.6074*(NOTBOTH)*VSU2 |
| 13. | -13.7633*VALSIGD |
| 14. | +108.19*PUR |
| 15. | +67.90*NCO |
| 16. | +0*CO |
| 17. | +0*HIL |
| 18. | +0*DC |
| 19. | +0*OTH |
| 20. | -79.06*ZONDIFU |
| 21. | +114.55*ZONDIFD |
| 22. | |
| 23. | If HVScore < 300 then HVScore = 300    \** scaling score to a range **\ |
| 24. | If HVScore > 900 then HVScore = 900 |
| 25. | |
| 26. | If (HVE value) > .90*(stated value) then HV Score = max(HVScore,600) |

FIG. 9

Sample Web Page With Result

Prepared For:   Lender Name              Loan Number:   TEST0409A

HVSCORE for 2801 SUNSET DR NE : 300

Property Information:
Street Address: 2801 SUNSET DR NE
City: TUSCALOOSA   State: AL   Zip: 35404 – 1234

Scores below 500 are at highest risk of faulty assessment
Scores below 600 are at moderate risk of faulty assessment
Scores above 700 have lowest risk

| LOAN NUMBER | 1ST APPRAISAL | VERIFIED APPRAISAL | OUT-COME | LTV | P FACTOR | CREDIT SCORE | CONDO FLAG | CASH OUT REFIN-ANCE |
|---|---|---|---|---|---|---|---|---|
| 1 | $200,000 | $205,000 | 0 | 60 | -1.4 | 775 | 0 | 0 |
| 2 | $150,000 | $100,000 | 1 | 110 | 4.0 | 400 | 0 | 0 |
| 3 | $175,000 | $125,000 | 1 | 120 | 4.5 | 450 | 0 | 1 |
| 4 | $50,000 | $50,000 | 0 | 65 | -1.9 | 800 | 0 | 0 |
| ... | | | | | | | | |
| ... | | | | | | | | |
| N$^{th}$ Loan | $75,000 | $75,000 | 0 | 70 | -1.85 | 790 | 0 | 0 |

FIG. 13

SYSTEM AND METHOD FOR PROVIDING AUTOMATED VALUE ESTIMATES OF PROPERTIES AS OF A SPECIFIED PREVIOUS TIME PERIOD

CROSS REFERENCE TO RELATED APPLICATION

This is a continuation-in-part of U.S. application Ser. No. 10/094,806, entitled "SYSTEMS AND METHODS FOR HOME VALUE SCORING," filed Mar. 12, 2002), which claims the benefit of U.S. Provisional Patent Application No. 60/311,125, entitled "SYSTEMS AND METHODS FOR HOME VALUE SCORING," filed on Aug. 10, 2001. This application is related to U.S. patent application Ser. No. 09/134,161, entitled "SYSTEM AND METHOD FOR PROVIDING PROPERTY VALUE ESTIMATES," filed on Aug. 14, 1998, which is based on U.S. Provisional Application Ser. No. 60/056,196 filed on Aug. 21, 1997. U.S. patent application Ser. No. 09/134,161 is itself a continuation-in-part of U.S. patent application Ser. No. 08/730,289, entitled "METHOD FOR COMBINING HOUSE PRICE FORECASTS," filed on Oct. 11, 1996. The present invention also relates to U.S. patent application Ser. No. 10/095,006, entitled "SYSTEM AND METHODS FOR GENERATING A MODEL FOR HOME VALUE SCORING," filed on Mar. 12, 2002. All six of these applications are expressly incorporated herein by reference in their entirety.

BACKGROUND OF THE INVENTION

I. Field of the Invention

The present invention generally relates to financial systems and to systems and methods for processing financial information. More particularly, the invention relates to systems and methods for evaluating the likelihood that an appraisal of property is faulty.

II. Background and Material Information

When an application for a mortgage loan is processed by a financial entity such as a lender, bank, mortgage bank, mortgage broker, or mortgage originator, the property securing the mortgage is usually appraised. Since various financial entities have an interest in knowing the true (or fair) market value of the property securing the mortgage, the appraisal of a property is an important part of the mortgage loan application process.

An appraisal provides a property value estimate indicating a market value for a property. The appraisal may be performed in various ways including, for example, an in-person property appraisal performed by an appraiser. During the in-person appraisal, the appraiser physically inspects the property. With or without a physical inspection of the property, recent sales information for comparable properties may be used to generate an appraisal.

Alternatively, an automated valuation model serves as a tool that utilizes various factors (e.g., ZIP code, lot size, number of bedrooms, etc.) to appraise a property. Examples of automated valuation models may be found in one or more of the following applications: U.S. patent application Ser. No. 08/730,289, filed on Oct. 11, 1996, entitled "METHOD FOR COMBINING HOUSE PRICE FORECASTS"; U.S. patent application Ser. No. 09/115,831, filed on Jul. 15, 1998, entitled "SYSTEM AND METHOD FOR PROVIDING HOUSE PRICE FORECASTS BASED ON REPEAT SALES MODEL" (now U.S. Pat. No. 6,401,070); U.S. patent application Ser. No. 09/134,161, filed on Aug. 14, 1998, entitled "SYSTEM AND METHOD FOR PROVIDING PROPERTY VALUE ESTIMATES"; U.S. patent application Ser. No. 09/728,061, filed on Dec. 4, 2000, entitled "METHOD FOR FORECASTING HOUSE PRICES USING A DYNAMIC ERROR CORRECTION MODEL"; all of which are hereby incorporated by reference in their entirety. Other types of appraisals that provide an informed estimate of property value may also be used to appraise a property. Because of the various forms that an appraisal may take, an appraisal may be burdensome for a financial entity to process and/or interpret. For example, a financial entity may find it difficult to readily assess the reliability of an appraisal and, as a result, order an unnecessary reappraisal of the property.

A financial entity may use an appraisal as part of its mortgage loan approval process. For example, when a borrower applies for a mortgage loan, the appraisal may be used by a bank to verify the value of the underlying property. The bank uses the property value as a factor in approving or rejecting the mortgage loan application. For example, when an appraisal indicates that a property is worth less than the mortgage amount, a bank may not be willing to accept the financial risk and will therefore reject the mortgage loan application. On the other hand, the bank may simply tell the borrower that the maximum amount borrowed cannot exceed the appraised property value, or a percentage thereof. For these and other reasons, the appraisal is usually considered an important part of the mortgage loan application process.

SUMMARY OF THE INVENTION

Accordingly, the present invention is directed to systems and methods for processing financial information and, more particularly, systems and methods for evaluating the likelihood that an appraisal of property is faulty.

A financial system consistent with the systems and methods of the present invention may provide, based on a model, an indication that an appraisal value for a property is likely to be faulty including, for example, receiving information representative of at least one of a borrower, a property, or one or more demographics; receiving the appraisal value of the property; and determining a score based on the received information, received appraisal, and the model, such that the score provides the indication of the likelihood that the appraisal value for the property is faulty.

Additional features and advantages of the invention will be set forth in part in the following description and in part will be obvious from the description, or may be learned by practice of the invention. The objectives and advantages of the invention may be realized and attained by the system and method particularly described in the written description and claims hereof as well as the appended drawings.

To achieve these and other advantages and in accordance with the purpose of the invention, as embodied and broadly described herein, there is also provided a method for providing an indication, based on a model, that an appraisal value for a property, which is secured by a mortgage loan, was likely to be faulty. The method includes, for example, receiving a date; receiving information representative of at least one of a borrower, a property, or one or more demographics, such that the received information corresponds to the date; receiving the appraisal value based on the date; and determining a score based on the received information, received appraisal, and the model, such that the score provides the indication of the likelihood that the appraisal value was faulty on the date.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 6 illustrates exemplary information received from a lender consistent with the systems and methods of the present invention;

FIG. 7 illustrates additional information that may be received consistent with the systems and methods of the present invention;

FIG. 8 depicts an exemplary web page interface for providing information consistent with the systems and methods of the present invention;

FIG. 9 shows an exemplary model for determining an indication that an appraisal value for a property is likely to be faulty consistent with the systems and methods of the present invention;

FIG. 13 shows an exemplary table of information for determining the one or more parameters of the model consistent with the systems and methods of the present invention;

DETAILED DESCRIPTION

Figure 1:
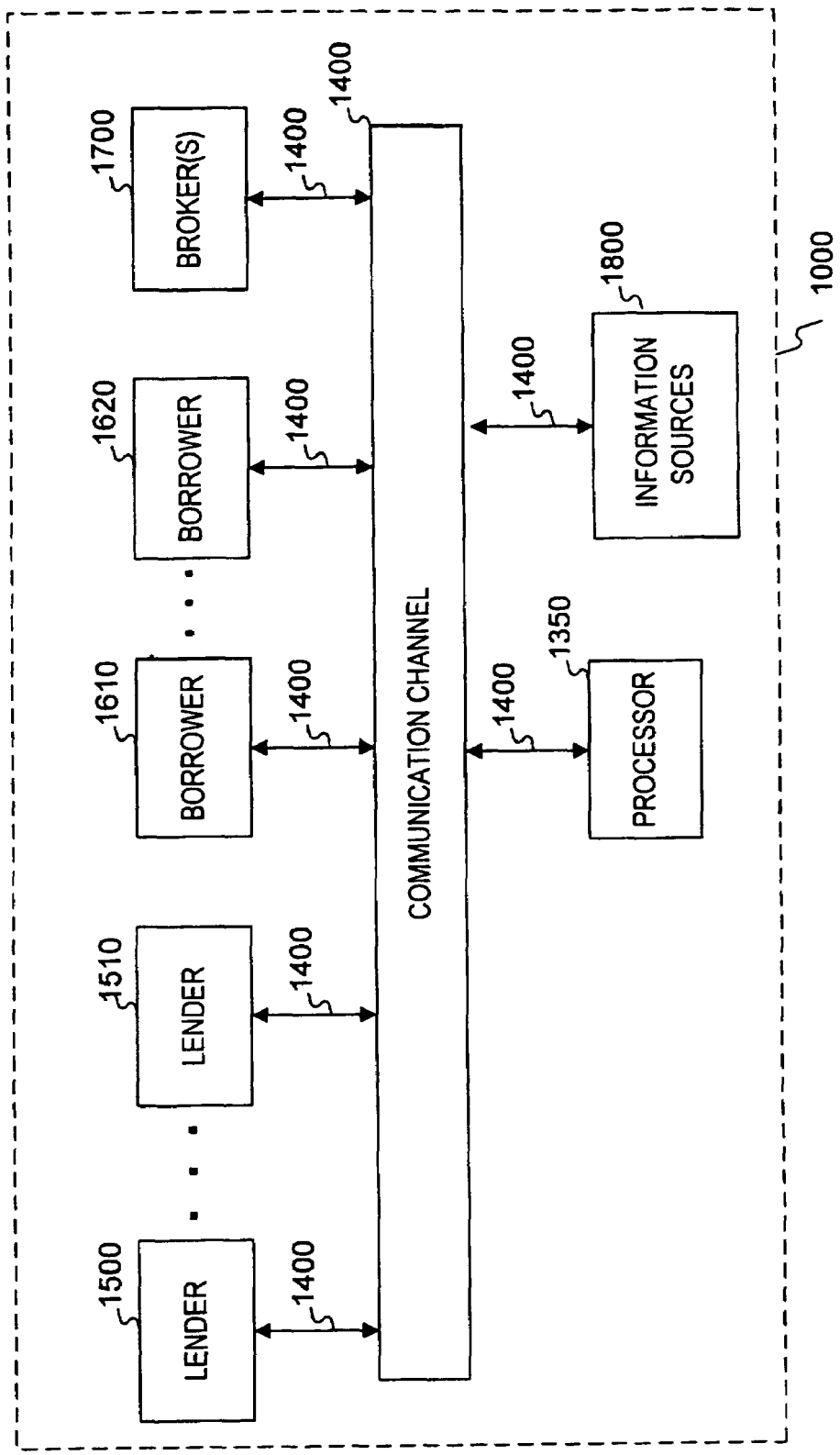
FIG. 1 illustrates an exemplary system environment consistent with the systems and methods of the present invention.

Reference will now be made in detail to the invention, examples of which are illustrated in the accompanying drawings. Wherever possible, the same reference numbers will be used throughout the drawings to refer to the same or like parts.

Systems and methods consistent with the present invention permit a financial entity, using a computing platform (or computer), to determine an indication of whether a property appraisal is likely to be faulty. Moreover, the financial entity may determine such indication in the form of a score, which is referred to herein as a Home Value (HV) Score. In one aspect of the invention, the computing platform determines the HV Score based on a model and scales the score into a range (e.g., 300 to 900) with a low score indicating a higher likelihood that the appraisal is faulty (i.e., the appraisal has a higher probability of being bad) and a high score indicating a low likelihood that an appraisal is faulty (i.e., the appraisal is probably "good").

By way of example only, a financial entity, such as a lender, bank, mortgage bank, mortgage broker, or mortgage originator, may process a borrower's mortgage loan application. That application may require an appraisal that is used to approve the mortgage loan application. For example, a mortgage originator may use the appraisal to determine a ratio of the loan amount to the property value (referred to as a loan-to-value ratio or LTV) with the appraisal serving as the property value. Based on the loan-to-value ratio, the mortgage originator may approve the mortgage loan. However, if the appraisal is faulty, the mortgage originator may then incorrectly approve the mortgage loan application. The mortgage originator thus has an interest in ensuring that if the appraisal is faulty, the appraisal is discounted and a "new" appraisal (or other method of valuation) is performed. Accordingly, by using the HV Score, a financial entity may readily assess the reliability of a property appraisal reducing the burden associated with processing and/or interpreting the appraisal. Moreover, because the HV Score makes it easier to interpret the reliability of the appraisal, the financial entity will be less likely to misinterpret an appraisal and/or request an unnecessary reappraisal.

In addition to evaluating an appraisal associated with an individual mortgage loan secured by real property, the HV Score may be used to evaluate each appraisal in a pool of mortgage loans. By way of example only, quality control (QC) of the mortgage pool may be more accurately targeted to those mortgage loans secured by properties whose appraisals have lower HV Scores. Rather than randomly selecting mortgage loans in the pool for QC verification of an acceptable loan-to-value ratio, a financial entity may use the HV Score to identify only those loans in the pool most likely to have an unacceptable ratio. Accordingly, the financial entity may initiate further investigation (e.g., order a "new" appraisal) only of the mortgage loans identified based on the corresponding HV Scores, reducing the financial and administrative burden on the financial entity.

Furthermore, the HV Score may be used retrospectively to evaluate one or more mortgage loans as of a date. For example, a financial entity, such as a lender, may use the HV Score to retrospectively assess the reliability of a property appraisal as of a date, such as when the mortgage loan closed. In this example, the HV Score retrospectively provides an indication of whether the property appraisal used to close the mortgage loan was faulty.

In situations when a mortgage loan defaults (or is delinquent with late payments), the lender may perform a quality control function that assesses whether the defaulting mortgage loan was also the subject of a faulty appraisal. In those situations, the lender would receive an HV Score as of the date the mortgage closed, such that the lender may be able to identify a possible factor that contributed to default (or delinquency).

FIG. 1 shows an exemplary system 1000 for providing an indication of whether an appraisal is likely to be faulty, such that the indication provides an HV Score, enabling a financial entity to readily determine the likelihood that the appraisal is likely to be faulty.

Referring to FIG. 1, the system includes a communication channel 1400, one or more lenders 1500,1510, one or more borrowers 1610, 1620, a broker 1700, one or more information sources 1800, and a processor 1350. The one or more lenders may include a financial entity, such as a bank, mortgage bank, mortgage broker, mortgage originator, and/or any other entity (or individual) seeking an indication of whether an appraisal value of a property is likely to be faulty. The one or more borrowers 1610, 1620 may include an entity, such as a consumer, seeking a mortgage loan. The broker 1700 may include an entity that acts as an agent, such as a mortgage broker. The information source 1800 may include internal, external, proprietary, and/or public databases, such as financial databases and demographic databases. For example, sources of information may include DataQuick Information Systems, International Data Management Inc., First American Corporation, county property and/or tax records, TransUnion LLC, Equifax Inc., Experian, Department of Commerce, and Bureau of Labor and Statistics. The processor 1350 may include an entity capable of processing information such that an HV Score is provided to, for example, a lender 1500, borrower 1610, broker 1700 and/or any other entity requesting an HV Score.

Although the communication channel 1400 is depicted in FIG. 1 as bi-directional, a skilled artisan would recognize that unidirectional communication links may be used instead.

Figure 2:
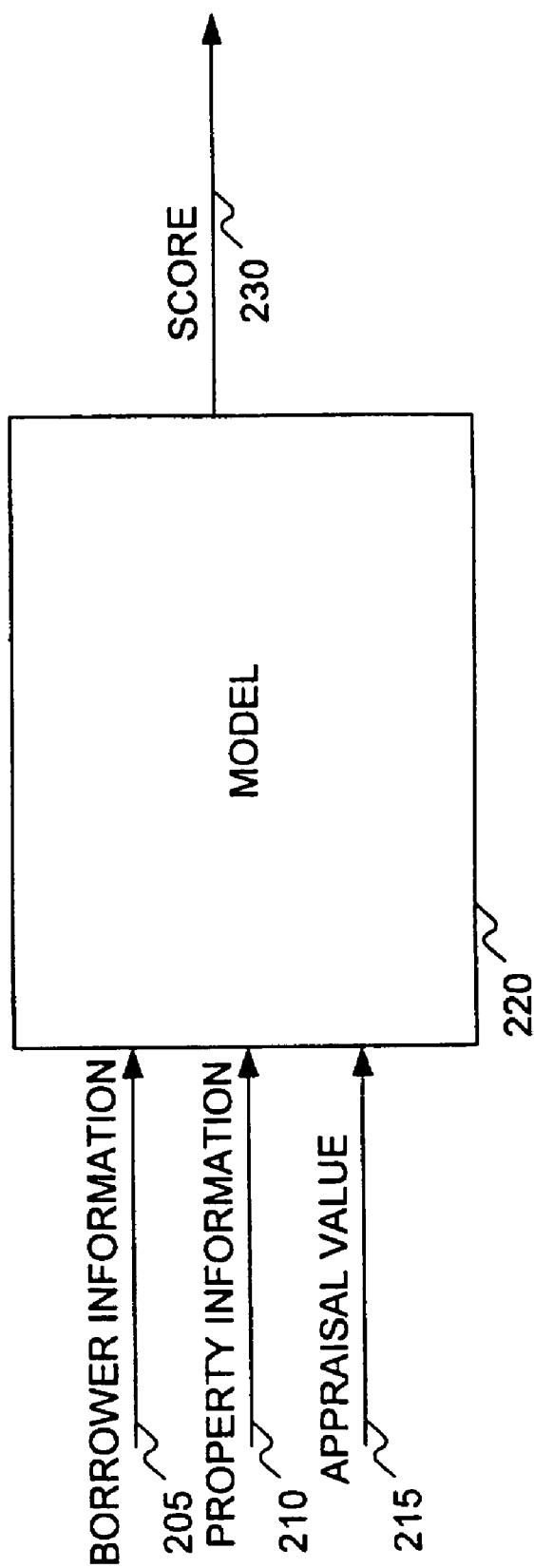
FIG. 2 is an exemplary block diagram for providing an indication that an appraisal value for a property is likely to be faulty using a model consistent with the systems and methods of the present invention.

FIG. 2 depicts a functional block diagram associated with providing an HV Score consistent with the systems and methods of the present invention. Referring to FIGS. 1 and 2, an entity, such as a lender 1500 providing a loan secured by a property, may provide the processor 1350 with information, such as information describing the borrower 205, information describing the property 210, and/or information describing the value of the property (e.g., an appraisal) 215. The processor 1350 may then use a model 220 to determine an HV Score. The processor 1350 may also provide the lender 1500 with the HV Score via a communication channel 1400.

In one aspect of the invention, the HV Score is scaled such that a low HV Score indicates that an appraisal, provided by the lender, is more likely to be faulty (i.e., the property appraisal does not reflect the fair market value). On the other hand, a high HV Score indicates that an appraisal is unlikely to be faulty (i.e., the property appraisal accurately reflects the fair market value). Accordingly, the HV Score facilitates determining whether an appraisal for a property is likely to be faulty. Thus, the lender may more accurately evaluate the borrower's mortgage loan application.

Figure 3A:
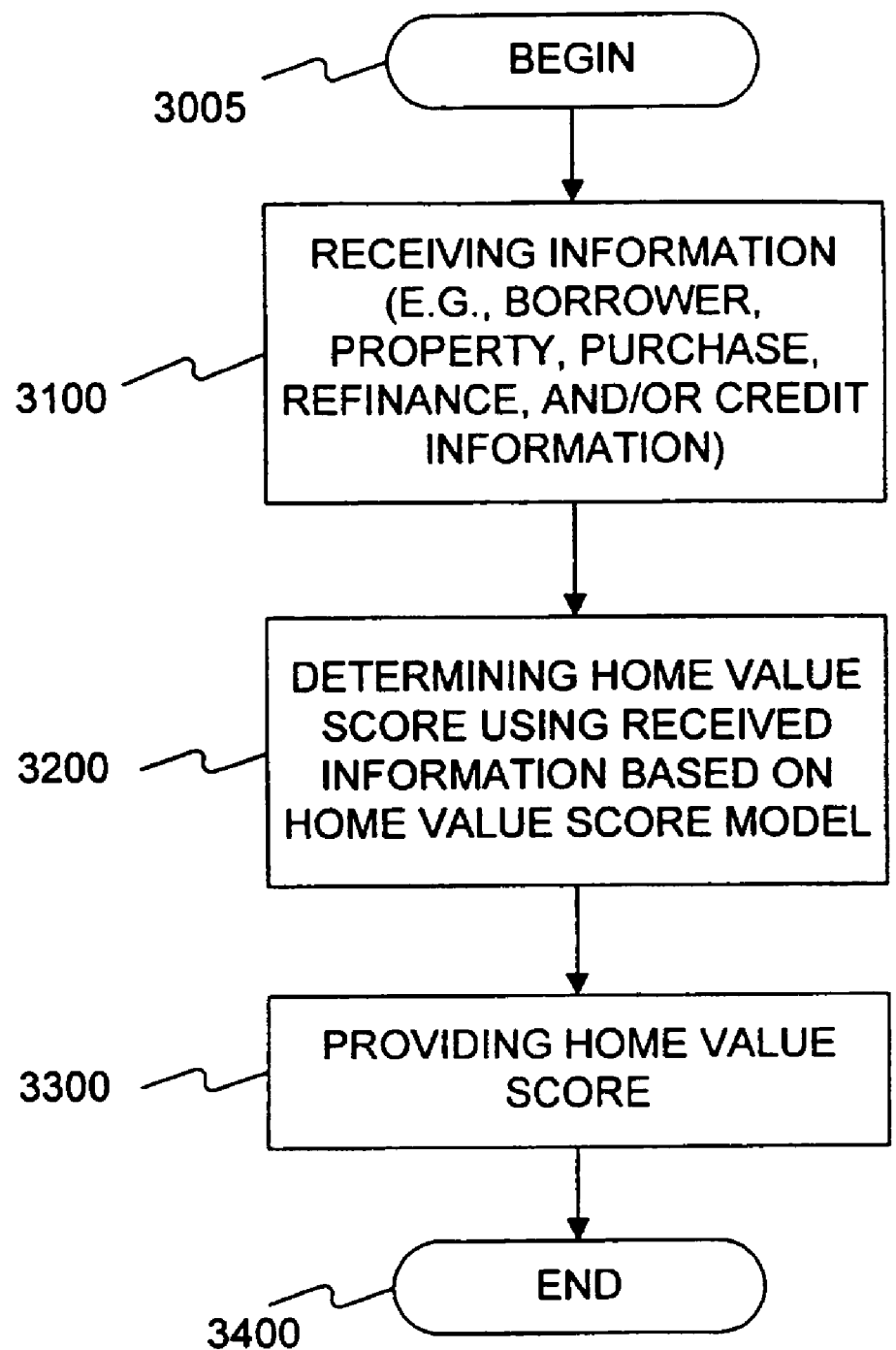
FIG. 3A is an exemplary flowchart for providing a home value score based on a model consistent with the systems and methods of the present invention.

FIG. 3A is an exemplary flowchart depicting steps for providing an HV Score. Referring to FIGS. 1 and 3A, in one embodiment, the processor 1350 may receive information (step 3100) through a communication channel 1400 from a mortgage originator, such as a lender. The received information may include, for example, information describing a borrower, a property, and an appraisal. In one aspect of the invention, the information describing the borrower may include the borrower's name, address, and credit history. Moreover, the property information describes the property and may include, for example, the address of the property securing the mortgage. Furthermore, the appraisal information provides an estimate of the property value and may include, for example, any indication of property value, such as a borrower's estimate of the property value, a lender's estimate of the property value, a purchase price, an in-person appraisal by an appraiser, and/or an automated valuation model appraisal (or estimate) of the property's value.

The processor 1350 may then determine an HV Score, using the information received from the mortgage originator, based on a model (step 3200). The processor 1350 may also provide the HV Score (step 3300) to the mortgage originator, such as lender 1500, through the communication channel 1400. The lender 1500 may then use the HV Score to determine whether the appraisal information for a property is more likely to be faulty. If the appraisal is likely to be faulty, the lender may then decide to order another appraisal.

In one embodiment, the processor 1350 may scale an HV Score such that the score falls within a range, such as 300-900. Table 1 shows three exemplary HV Scores with a likelihood that an appraisal is faulty and a proposed action for the lender 1500. For example, when the processor 1350 provides an HV Score of 500 to the lender 1500, the HV Score may indicate that a property appraisal is highly likely to be unreliable (or faulty). With an HV Score of 500, the HV Score may lead a lender 1500 to conclude that a review of the appraisal is appropriate, such as requesting another appraisal (e.g., an in-person appraisal by another appraiser).

When the processor 1350 provides an HV Score of 600 to the lender 1500, the HV Score of 600 may indicate that a property appraisal is somewhat less likely to be unreliable than a score of 500. In this case, the lender 1500 may conclude that another appraisal is appropriate. However, since the HV Score is on the borderline of being reliable, the lender 1500 may simply request a less costly automated appraisal using an automated valuation model (AVM), such as Home Value Explorer$^{SM}$ (HVE). The lender 1500 may then review the output from the AVM (including recent comparable sales in the neighborhood) to determine the reasonableness of the appraisal.

When the processor 1350 provides an HV Score of 700 to the lender 1500, the HV Score of 700 may indicate that a property appraisal is likely to be more reliable than the score of 600. In this case, the lender 1500 may be confident that the property appraisal is reliable. Accordingly, the lender 1500 may conclude that a reappraisal is unnecessary.

Although Table 1 shows three HV Scores between 500 and 700, any other range of HV Scores may be used instead including, for example, a range of HV Scores from 1 to 10 or 300 to 900. Moreover, although Table 1 shows a lower likelihood of a faulty appraisal at higher HV Scores, a skilled artisan would recognize that a lower likelihood of a faulty appraisal may be represented with lower HV Scores instead.

TABLE 1

Exemplary HV Scores

| HV SCORE FOR A PROPERTY | LIKELIHOOD OF FAULTY APPRAISAL | PROPOSED ACTION |
| --- | --- | --- |
| 500 | High | Order a review of the appraisal |

TABLE 1-continued

Exemplary HV Scores

| HV SCORE FOR A PROPERTY | LIKELIHOOD OF FAULTY APPRAISAL | PROPOSED ACTION |
| --- | --- | --- |
| 600 | Medium | Order an appraisal using an automated valuation model and/or review comparable recent sales (if any) |
| 700 | Low | Do nothing |

Figure 3B:
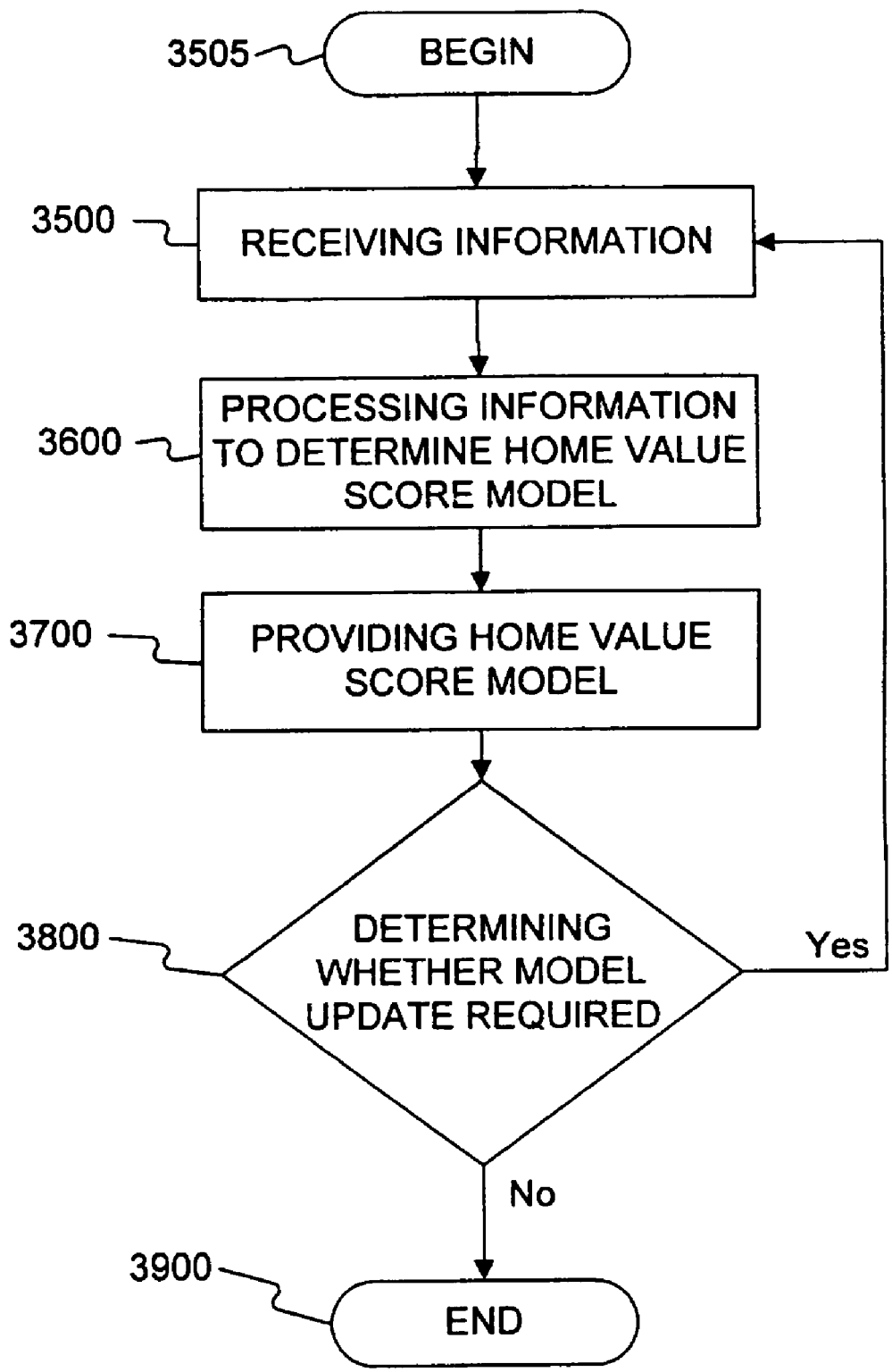
FIG. 3B is an exemplary flowchart for generating a model consistent with the systems and methods of the present invention.

FIG. 3B is an exemplary flowchart depicting steps for generating a model, such as an HV Score model, capable of providing an HV Score. Referring to FIGS. 1 and 3B, in one embodiment, the processor 1350 may begin by receiving information from various sources of information (e.g., information source 1800) to enable the processor 1350 to generate the HV Score model (step 3500). The processor 1350 may then process the received information (step 3600) to determine the coefficients (also referred to as weights) that make up the HV Score model. The processor 1350 may then provide the HV Score model to one or more entities (e.g., lenders 1500, 1510 and/or brokers 1700) to permit those entities to determine the HV Scores for appraisals. Referring again to FIG. 2, the HV Score model may thus be used as a model 220 to determine an HV Score 230. Although an HV Score model is described herein, a skilled artisan would recognize that any type of model that provides a score may be used instead.

In one aspect of the invention, the processor 1350 may periodically (e.g., yearly, monthly, etc.) update the HV Score model by providing an updated set of HV Score model coefficients (step 3800).

Figure 4:
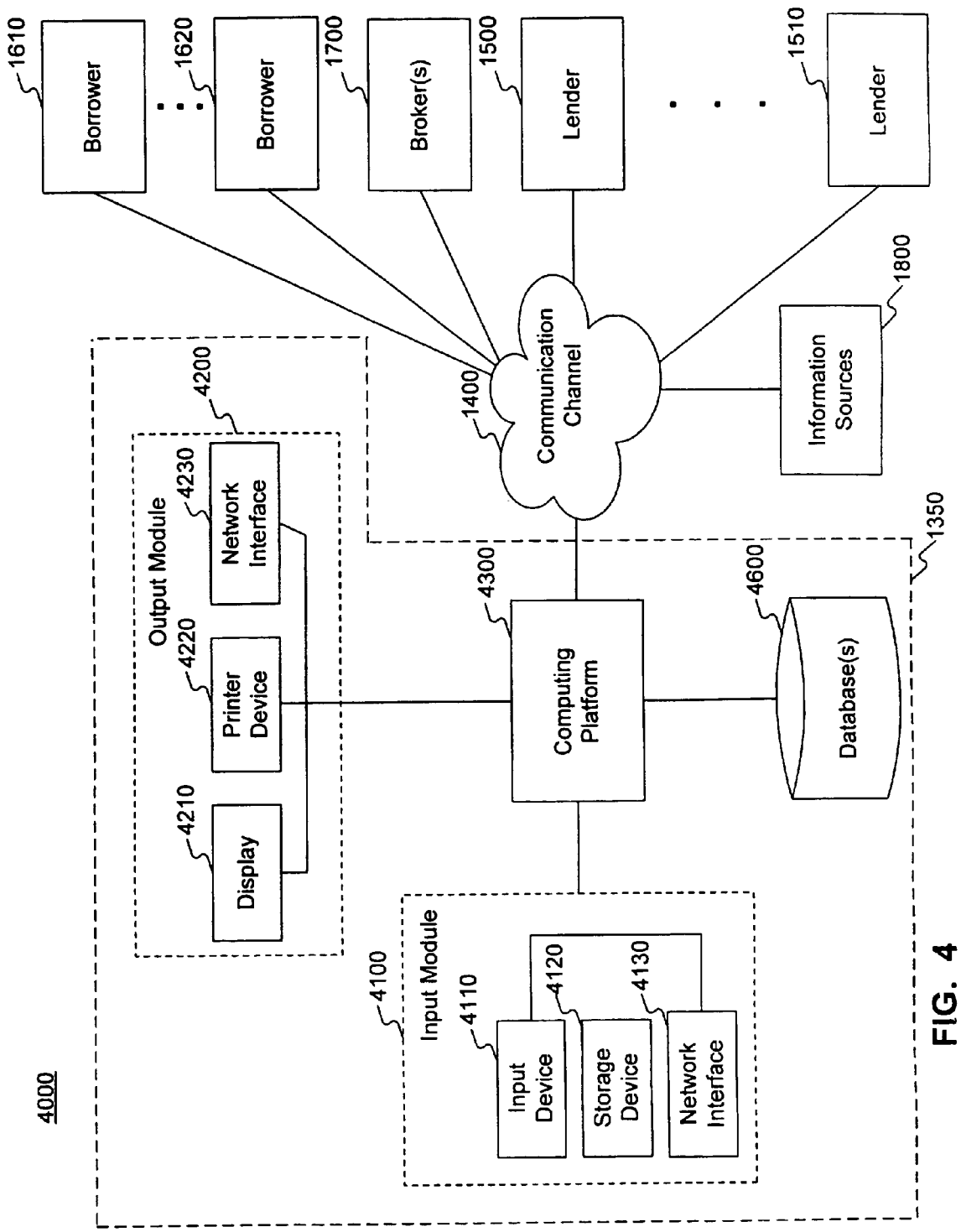
FIG. 4 illustrates another exemplary system environment consistent with the systems and methods of the present invention.

FIG. 4 illustrates another exemplary system 4000 environment consistent with the systems and methods of the present invention. As illustrated in FIG. 4, the system environment 4000 includes a processor 1350, one or more lenders 1500, 1510, one or more borrowers 1610, 1620, one or more brokers 1700, one or more information sources 1800, and a communication channel 1400. The processor 1350 may also include an input module 4100, an output module 4200, a computing platform 4300, and one or more databases 4600.

In one embodiment consistent with FIG. 4, the computing platform 4300 may include a data processor such as a PC, UNIX server, or mainframe computer for performing various functions and operations. Computing platform 4300 may be implemented, for example, by a general purpose computer or data processor selectively activated or reconfigured by a stored computer program, or may be a specially constructed computing platform for carrying-out the features and operations disclosed herein. Moreover, computing platform 4300 may be implemented or provided with a wide variety of components or systems including, for example, one or more of the following: one or more central processing units, a co-processor, memory, registers, and other data processing devices and subsystems.

Communication channel 1400 may include, alone or in any suitable combination a telephony-based network, a local area network (LAN), a wide area network (WAN), a dedicated intranet, the Internet, or a wireless network. Further, any suitable combination of wired and/or wireless components and systems may be incorporated into communication channel 1400. Although the computing platform 4300 may connect to the lenders 1500, 1510 through the communication channel 1400, computing platform 4300 may connect directly to the lenders 1500, 1510.

Computing platform 4300 also communicates with input module 4100 and/or output module 4200 using connections or communication links, as illustrated in FIG. 4. Alternatively, communication between computing platform 4300 and input module 4100 or output module 4200 may be achieved using a network (not shown) similar to that described above for communication channel 1400. A skilled artisan would recognize that computing platform 4300 may be located in the same location or at a geographical separate location from input module 4100 and/or output module 4200 by using dedicated communication links or a network.

Input module 4100 may be implemented with a wide variety of devices to receive and/or provide information. Referring to FIG. 4, input module 4100 may include an input device 4110, a storage device 4120, and/or a network interface 4130. Input device 4110 may also include a keyboard, a mouse, a disk drive, telephone, or any other suitable input device for receiving and/or providing information to computing platform 4300. Although FIG. 4 only illustrates a single input module 4100, a plurality of input modules 4100 may also be used.

Storage device 4120 may be implemented with a wide variety of systems, subsystems and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage and/or memory.

Network interface 4130 may exchange data between the communication channel 1400 and computing platform 4300 and may also exchange data between the input module 4100 and the computing platform 4300. In one aspect of the invention, network interface 4130 may permit a connection to at least one or more of the following networks: an Ethernet network, an Internet protocol network, a telephone network, a radio network, a cellular network, or any other network capable of being connected to input module 4100.

Output module 4200 may include a display 4210, a printer 4220, and/or a network interface 4230. The output module 4200 may be used to provide, inter alia, an HV Score to lenders 1500, 1510, provide an HV Score model to a computing platform 4300, and/or provide the HV Score model to any entity (or processor) seeking to determine an HV Score. Further, the output from computing platform 4300 may be displayed or viewed through display 4210 (e.g., a cathode ray tube or liquid crystal display) and/or printer device 4220. For example, the HV Score may be viewed on display 4210 and/or printed on printer device 4220. Although FIG. 4 only illustrates a single output module 4200, a plurality of spatially separated output modules 4200 may be used.

The printer device 4220 may provide output that includes information that summarizes multiple HV Scores. The summary information may include average HV Scores, percentage of HV Scores that fall above or below a threshold score, and/or other tabular/graphical information for summarizing multiple HV Scores. Moreover, multiple HV Scores and the corresponding summary information may also be categorized based on state, lender (or lender branch), appraiser, or other user defined categories.

Network interface 4230 exchanges data between the output module 4200 and the computing platform 4300 and/or between the computing platform 4300 and the communication channel 1400. The network interface 4230 may permit connection to at least one or more of the following networks:

an Ethernet network, and Internet protocol network, a telephone network, a cellular network, a radio network, or any other network capable of being connected to output module 4200.

The database 4600 may store information including financial information, demographic information, real estate information, credit information, and other public and/or proprietary information that is kept within an entity or organization. For example, the database 4600 may store information received from the information source 1800 such as information from DataQuick Information Systems, International Data Management Inc., First American Corporation, county property and/or tax records, TransUnion LLC, Equifax Inc., Experian, Department of Commerce, and Bureau of Labor and Statistics. Although the database 4600 is shown in FIG. 4 as being located with the computing platform 4300, a skilled artisan would recognize that the database (or databases) may be located anywhere (or in multiple locations) and connected to the computing platform via direct links or networks.

Figure 5:
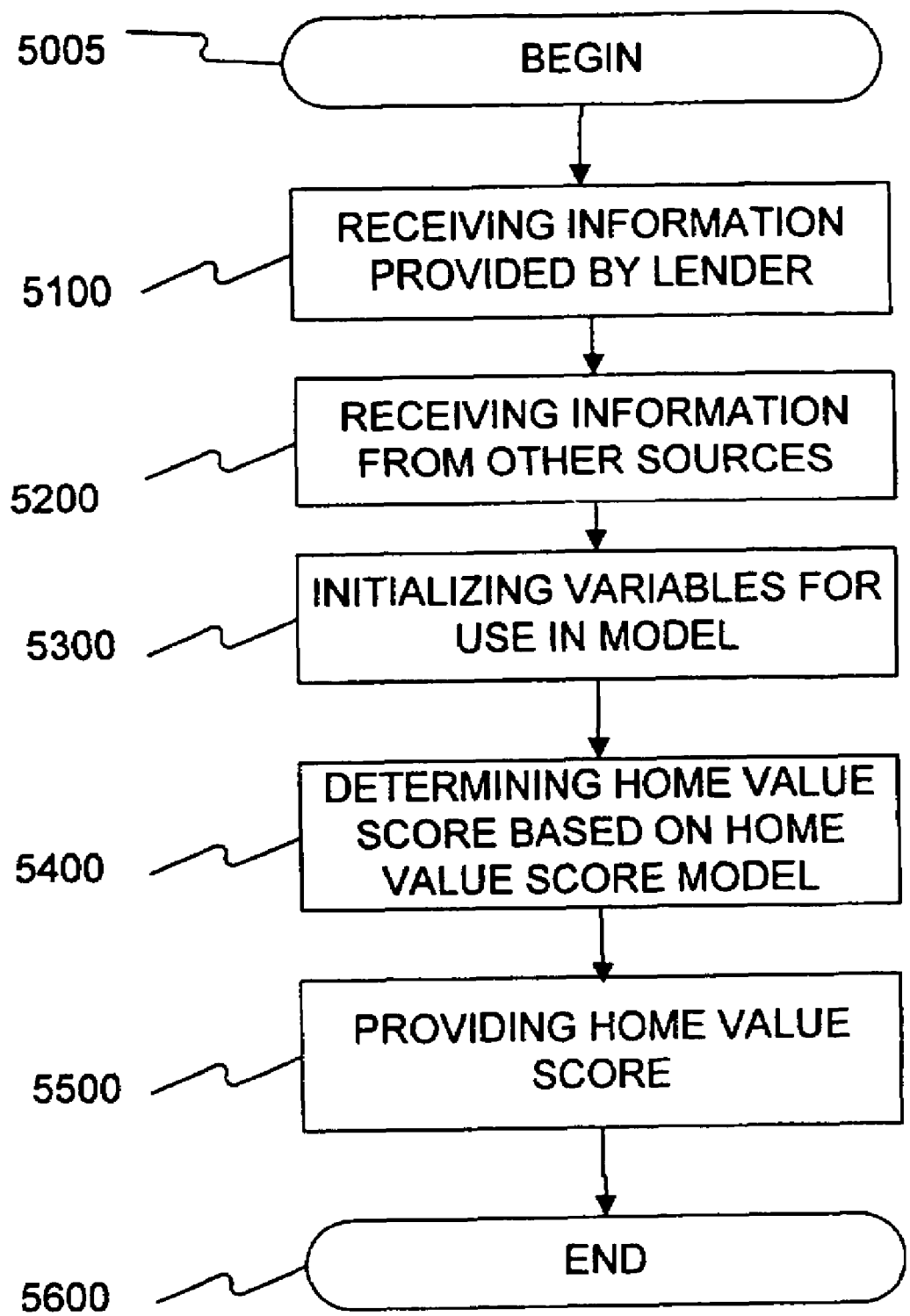
FIG. 5 is another exemplary flowchart for providing a home value score consistent with the systems and methods of the present invention.

FIG. 5 shows another exemplary flowchart with steps for providing the HV Score. Referring to FIGS. 4 and 5, the computing platform 4300 begins (step 5005) when it receives information (step 5100). For example, the computing platform 4300 may receive information provided by the lenders 1500, 1510 through the communication channel 1400. The computing platform 4300 may also receive information from other sources, such as the information source 1800 and/or database 4600 (step 5200); initialize one or more variables for use in the HV Score model (step 5300); determine the HV Score based on the HV Score model and received information (step 5400); and end when it provides the HV Score (steps 5500-5600).

To receive information provided by the lender (step 5100), the computing platform 4300 may receive from the lender, such as lender 1500, information representative of a borrower, the property, or demographic information. In one aspect of the invention, the computing platform 4300 may receive information from the lender 1500 through the communication channel 1400. This received information may include the information depicted in FIG. 6.

Referring to FIG. 6, the received information from the lender 1500 may include one or more of the following: a loan reference number; the identity of a lender; a street address of a property; the city, state, and ZIP code of the property; a stated value of the property (e.g., an appraisal provided by the borrower or the lender); an amount corresponding to the total amount borrowed or secured by the property; and information indicating whether the mortgage loan is secured by a condominium, town house, single family home, 2-4 unit dwelling, or multifamily dwelling. Moreover, the information received from the lender 1500 may include information indicating the mortgage loan type, such as whether the mortgage loan is for the purchase of a property, a mortgage refinancing, a mortgage refinancing with cash returned to the borrower (referred to as a "cash out" refinance), a home improvement loan, a debt consolidation loan, or any other type of mortgage loan. Furthermore, the received information may include an indication of the borrower's credit worthiness, such as a credit history or credit score(s); a flag indicating a source of the borrower credit information (e.g., credit information provided by a lender or a source of credit information); and/or any other information describing the borrower, the property, or demographics associated with the borrower or the property.

Moreover, the stated value of the property may correspond to an appraisal value of the property. As noted above, the appraisal value of a property may be any type of property appraisal including, for example, an in-person property appraisal, a borrower's property value estimate, a lender's property value estimate, a sales price for the property, a loan amount, an automated valuation model (AVM) appraisal.

Referring again to FIG. 5, to receive information from other sources (step 5200), the computing platform 4300 may interface with, or be embedded in, one or more systems (not shown), that provide financial information, credit information, and/or real estate information, such as systems that are used to originate loans, provide appraisals (or value property), and/or provide quality control tools for the mortgage loan process.

In one aspect of the invention, the computing platform 4300 may also interface with one or more sources of information (e.g., database 4600 and/or the information source 1800). The sources of information may provide, inter alia, median home price information for a region, borrower credit information (e.g., credit reports or credit scores), property appraisal information for one or more properties, and/or any other information that may be a factor in determining the accuracy or reliability of a property appraisal.

The sources of information may also provide the computing platform 4300 with the information listed in FIG. 7. Referring to FIG. 7, the information received by the computing platform 4300 may include one or more of the following: a borrower's credit score(s); a ZIP code with its plus 4 extension (if available) for a property; an AVM estimate, a standard deviation for the AVM estimate; and/or a value corresponding to a median price for a property in a region (listed in FIG. 7 as a "zone point value"). The region may correspond to a street, a neighborhood, a city, a ZIP code, a county, a census tract, a metropolitan statistical area, a state, and/or a country.

In one aspect of the invention, the information depicted in FIG. 6 is provided via a web-based input. FIG. 8 shows a web page for providing information to a processor 1350 (or computing platform 4300) via the communication channel 1400 (e.g., the Internet). A lender, a borrower, a broker, and/or any other entity seeking an HV Score may access the web page of FIG. 8 to provide processor 1350 (or computing platform 4300) with information. The information provided via the web page of FIG. 8 may then be used by the computing platform 4300 to determine the HV Score.

Referring again to FIG. 5, to initialize variables for use in the HV Score model (step 5300), the computing platform 4300 may initialize one or more of the variables in the HV Score model based on the information received in steps 5100 and 5200. In one embodiment, the computing platform 4300 may initialize the variables, such as the variables listed in Table 2 below.

Referring to Table 2, the computing platform 4300 may initialize one or more variables based on the received information in steps 5100-5200. For example, the computing platform may initialize the variable "CS" with a credit score received from the lender. The variable "CS 660" and "CS 760" adjusts the sensitivity of the HV Score when the variable "CS" is above 660 or 760, respectively. The variable "MCRED" may provide a flag indicating that the credit score is missing. The variable "LTV" (loan-to-value) may correspond to the ratio of the loan amount to the fair market value of the property multiplied by 100. For example, a mortgage of $100,000 on a property valued at $200,000 would have an "LTV" of 50. The variables "LTV 71," LTV 81," and "LTV 91" adjust the sensitivity of the HV Score to the variable "LTV" when "LTV" exceeds 70, 80, or 90, respectively.

In addition, the computing platform 4300 may initialize variables based on the purpose (or type) of mortgage loan. For example, the variable "CONDO" may correspond to a flag that is a "1" when the property type is a condominium. The variable "PUR" may indicate that the mortgage purpose corresponds to a mortgage only for a property purchase (e.g., without cash out). The variable "NCO" may correspond to a "1" when the mortgage purpose corresponds to a rate/term refinancing. The variable "CO" may be set to a value of "1" when the mortgage purpose corresponds to a cash out refinance (i.e., cash returned to the borrower). The variable "HIL" may indicate that the mortgage purpose corresponds to a home improvement loan. The variable "DC" may indicate that the mortgage purpose includes a borrower's debt consolidation mortgage loan. The variable "OTH" may indicate that the mortgage purpose is unknown or other than the ones mentioned above.

TABLE 2

Initialized Variables

CS = credit score expressed in integers, e.g. 715
CS660 = max(CS-660,0)
CS760 = max(CS-760,0)
MCRED = 1 if Credit Score is missing, otherwise 0;
LTV = total loan-to-value ratio, expressed as an integer, e.g. 80
    So (total loan amt/stated value)*100
LTV71 = max(LTV-70,0)
LTV81 = max(LTV-80,0)
LTV91 = max(LTV-90,0)
CONDO = 1 if property is Condominium, else 0
PUR = 1 if purpose is purchase, else 0
NCO = 1 if purpose is rate/term refinance, else 0
CO = 1 if purpose is cash out refinance, else 0
HIL = 1 if purpose is home improvement loan, else 0
DC = 1 if purpose is debt consolidation, else 0
OTH = 1 if purpose is other, else 0
VALSIG = (log(stated value) − log(CPV))/St dev. (Logs are natural logs)
If VALSIG > 0 then VALSIGU = VALSIG. Else VALSIGU = 0
If VALSIG < 0 then VALSIGD = VALSIG. Else VALSIGD = 0
ZONDIF = (log(stated value) − log(Zone Point Value)).
If ZONDIF > 0 then ZONDIFU = ZONDIF. Else ZONDIFU = 0
If ZONDIF < 0 then ZONDIFD = ZONDIF. Else ZONDIFD = 0
If Hedonic Point Value > 10,000 and Repeat Sales Point Value > 10,000
then NOTBOTH=0;
    ELSE NOTBOTH=1;
VSU2 = max(VALSIGU-2.0,0);

The variable "VALSIG" may be determined based on the following equation:

$$VALSIG = (\log(\text{stated value}) - \log(CPV))/\text{St dev} \qquad \text{Equation 1}$$

where CPV means combined point value; where "St dev" represents the standard deviation associated with the property valuations provided by an automated valuation model (AVM), such as HVE. The variable VALSIG represents the number of standard deviations (or sigmas ($\sigma$)) between the stated value (or appraisal) of the property and the estimated value provided by the AVM. In this example, the AVM provides a property valuation estimate that is just one of the numerous factors considered when determining the HV Score.

The variables "VALSIGU" and "VALSIGD" may be determined based on the value of "VALSIG," as shown in Table 2. The value of the variable "ZONDIF" may be determined based on the following equation:

$$ZONDIF = (\log(\text{stated value}) - \log(\text{Zone Point Value})) \qquad \text{Equation 2}$$

The values of variable "ZONDIFU" and "ZONDIFD" may be determined based on the value of "ZONDIF," as shown in Table 2. Further, the variable "NOTBOTH" may be set to a value of zero when two types of automated valuation models are used (e.g., using a valuation model based on repeat sales and one based on hedonics), while "NOTBOTH" is set to a value of one when only a single type of automated valuation model is used.

The variable "VSU2" may be determined based on the value of the variable "VALSIGU," as shown in Table 2. The variable VSU2 adjusts the sensitivity of the HV Score with respect to the VALSIG value of Equation 1.

To determine the HV Score (step 5400 of FIG. 5), the computing platform 4300 may use the HV Score model to compute the HV Score. Referring again to FIG. 2A, the HV Score model, may produce an HV Score 230 based on one or more of the following: borrower information 205, property information 210, and an appraisal value 215. In one aspect of the invention, the computing platform may determine an HV Score by multiplying the initialized one or more variables from step 5300 by one or more corresponding coefficients (or weights) that are part of the HV Score model 220. Moreover, the computing platform 4300 may scale the HV Score into a predetermined range, such as the range of 300 to 900. The computing platform 4300 may then provide the scaled score as the HV Score to the lender or other entity that requested the score (step 5500).

In one embodiment of the present invention, the HV Score provided above in step 5500 is retrospective in that the lender (or user) specifies a date (also referred to herein as an "as of" date) for the HV Score. In that embodiment, the computing platform 4300 may receive from the lender the date and information corresponding to that date (e.g., information representative of a borrower, the property, or demographic information) (step 5100). For example, the date may represent when a mortgage loan closed. In this example, the HV Score for that date indicates the faultiness of the appraisal as of the date the mortgage loan closed.

Referring again to FIG. 6, the received information from the lender 1500 may include the as of date (not shown). Moreover, the information received from the lender, such as the information depicted in FIG. 6, may be information as of the date specified by the lender. For example, a lender (or user) may provide the information depicted in FIG. 6 for a mortgage loan that closed in 1997. When that is the case, the lender may select the as of date as 1997, the Borrower's credit score as of 1997, and one or more of the information (depicted in FIG. 6) for the 1997 timeframe. The received information for 1997 may be associated with the mortgage loan documents from 1997.

The computing platform 4300 may also receive the information listed in FIG. 7 based on the as of date specified by the lender (step 5200). For example, the AVM estimate, the standard deviation for the AVM estimate, and/or the zone point value (all described above) may be based on the 1997 timeframe specified by the lender. For example, if the lender specifies "1997" and provides a property address of "100 Home Sweet Home Street, AnyWhere, N.Y., 14621-9999," the AVM uses data corresponding to 1997 for that property. The AVM then provides a 1997 price estimate, a standard deviation based on that price estimate (i.e., the AVM standard deviation), and an indication of the median price for the region associated with the property (also referred to herein as zone point value).

To determine the HV Score as of the date specified by the lender, the computing platform may then initialize one or more variables for use in the HV Score model based on the information received in steps 5100 and 5200, as described above for step 5300. In one embodiment, the computing platform 4300 may use a current (or recent) HV Score model.

Alternatively, a previous (or old) HV Score model, such as an HV Score model corresponding to the date specified by the lender may be used instead.

The computing platform 4300 then determines the HV Score and provides the HV Score for the as of date specified by the lender (steps 5400-5600). Accordingly, a lender may receive a retrospective HV Score on a mortgage loan that is performing poorly (e.g., in default or late payments)—enabling the lender to assess whether the appraisal used to close the mortgage was faulty. Although reference is made in this embodiment to a lender, any financial entity can assess the reliability of an appraisal as of a date including, for example, auditors and quality control departments. Moreover, although reference is made to a single mortgage, retrospective HV Scores can also be provided on a plurality of mortgage loans, such as a pool of mortgages.

Although the as of date may represent an actual date, such as the closing date of a mortgage loan, the as of date may also represent any other date including a timeframe (or time period) or an approximate date. For example, the as of date may correspond to the year, month, and/or date (e.g., 1997, August, and/or Aug. 7, 1997). Moreover, a skilled artisan would recognize that an appraisal used for a mortgage loan may have been performed before the mortgage close (and in some cases up to a year before closing). In that case, the as of date provided by the lender may correspond to the closing date of the mortgage loan, the appraisal date, or any other date.

FIG. 9 shows an exemplary model, such as an HV Score model. Referring to FIG. 9, the computing platform 4300 may determine the product of the initialized variable and corresponding model coefficient (lines 1-21). For example, computing platform 4300 would determine the product of the coefficient "−11.0280" and the initialized variable "LTV" by multiplying these two values (line 6). As illustrated in FIG. 9, the computing platform 4300 then sums all of the determined products to produce an HV Score.

Moreover, in one aspect of the invention, an HV Score is scaled into a range of 300 to 900 such that an HV Score of 300 suggests that an appraisal value received from a lender may be faulty. On the other hand, an HV Score of 900 would indicate that the appraisal value is likely to be reliable. FIG. 9 at lines 23-24 shows that an HV Score that is less than 300 is scaled to 300 and an HV Score that is more than 900 is scaled to 900.

Figure 10:
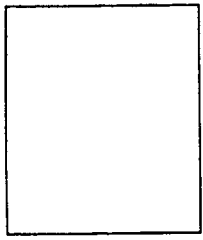
FIG. 10 depicts an exemplary web page interface for receiving an indication that an appraisal value for a property is likely to be faulty consistent with the systems and methods of the present invention.

FIG. 10 depicts an exemplary web page with an HV Score that is provided to an entity, such as lender 1500. The computing platform 4300 may provide the HV Score to the lender 1500 through the communication channel 1400. As illustrated in FIG. 10, the HV Score may provide the lender 1500 with an indication of whether the property appraisal is likely to be faulty. By way of example only, FIG. 10 depicts that an HV Score below 500 maybe considered at "highest risk" of being faulty, suggesting to the lender 1500 that a review of the appraisal may be appropriate. A review of the appraisal may include a second appraisal, such as an in-person appraisal or automated valuation model appraisal. An HV Score between 500-600 may be considered at "moderate risk" of being faulty, suggesting to the lender 1500 that it conduct a review of comparable recent home sales and/or an automated valuation model appraisal. When an HV Score is above 700, the appraisal is at "lowest risk" of being faulty, suggesting to the lender 1500 that no further review or verification of the appraisal is necessary.

Figure 11:
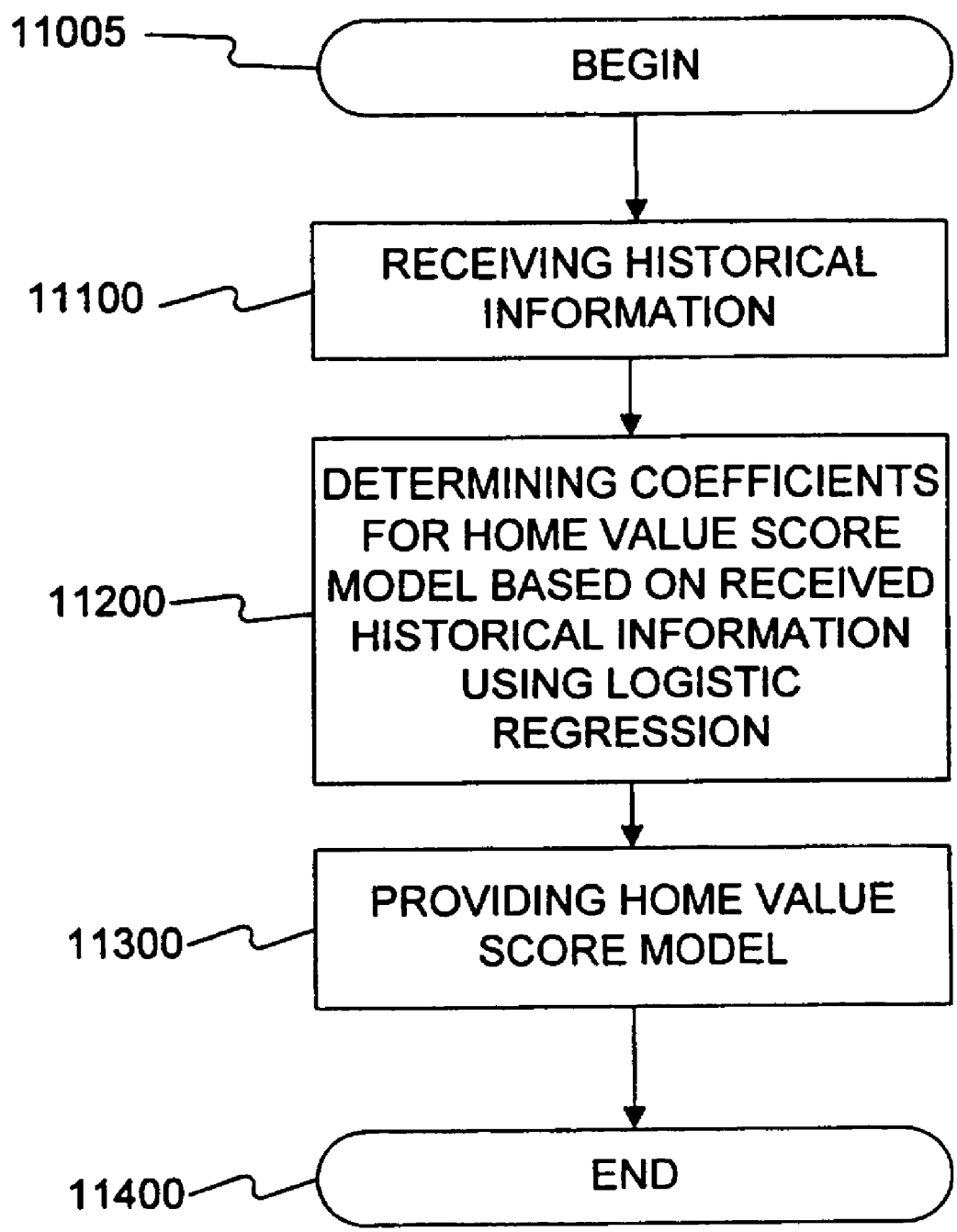
FIG. 11 is another exemplary flowchart for generating a model consistent with the systems and methods of the present invention.

In one embodiment, the computing platform 4300 may also generate the model, such as the HV Score model. FIG. 11 shows a flow chart depicting the steps associated with generating the HV Score model. The computing platform 4300 may begin by receiving historical (or truth) information (step 11100); determining one or more coefficients (or weights) for the HV Score model based on the received historical information (step 11200); and ends when it provides the HV Score model (steps 11300-11400).

The computing platform 1300 may receive historical information for one or more loans from sources of information, such as database 4600 or the information source 1800. The historical information may include borrower information, demographic information, loan information, and/or property information. Moreover, the historical information may include information that is considered reliable and, preferably, verified (e.g., "truth" data).

In one aspect of the invention, the computing platform 4300 uses appraisal information that is reliable and verified. For example, a first appraisal performed on a property may be verified by a second appraisal, such as an in-person appraisal. If a second appraisal confirms the validity of the first appraisal, the first appraisal thus serves as historical information that is reliable and verified. Although unreliable and unverified data may also be used, the quality of the HV Score model may be improved by using reliable and verified data.

In one aspect of the invention, the computing platform 4300 may also receive from a source of information (e.g., database 4600 or information source 1800) one or more of the following information that may serve as historical information: borrower credit information (e.g., credit history), a credit score, a credit card balance, a credit card limit, and a ratio of a credit card balance to a credit card limit; a borrower's mortgage loan size; a borrower's car loan size; a borrower's delinquencies, such as 30, 60, or 90-day delinquencies (e.g., past due payments on debt); a median (or average) income for a region, such as a street, a neighborhood, a city, a ZIP code, a county, a state, a country, a census tract, and/or a metropolitan statistical area; an indication of whether the borrower is a first time home buyer; a type associated with the loan, such as whether the loan is for a purchase, a refinance, or a cash-out refinance; a loan-to-value ratio for borrower's mortgage loan; a borrower's current home value; an indication of whether the mortgage loan is secured by a condominium, a single family home, a town house, a 2-4 unit dwelling, a multifamily dwelling, a home in a planned community; a number indicating the quantity of wage earners in the borrower's household; a number of co-borrowers; a number indicating the quantity of residential units on a property; and/or any other information that may contribute to generating an HV Score model. Moreover, the computing platform 4300 may receive the historical information for a plurality of loans.

To determine the coefficients (step 11200), the computing platform 4300 may process the historical information received in step 11100 based on statistical techniques, such as a logistic regression. By using statistical techniques, the computing platform 4300 may determine the corresponding coefficients (or weights) of the HV Score model. Referring again to FIG. 9, the exemplary HV Score model lists coefficients including the following: 696.7000, +1.1513, +0.7011, −1.4889, +816.3115, −11.0280, +1.4715, +1.1859, −4.2848, −53.3393, −34.6074, +34.6074, −13.7633, +108.19, +67.90, +0, +0, +0, +0, −79.06, and +114.55. The computing platform 4300 thus uses a statistical technique to determine each of these coefficients.

In one embodiment, the computing platform 4300 may use a statistical technique referred to as logistic regression to determine the coefficients. Logistic regression models may be used to examine how various factors influence a binary outcome. An event (or result) that has two possible outcomes is a binary outcome (e.g., good/bad or faulty/reliable). Logistic modeling is available with many statistical software packages. For example, the commercially available statistical packages offered by SAS Institute Inc. include logistic regression modeling tools.

Figure 12:
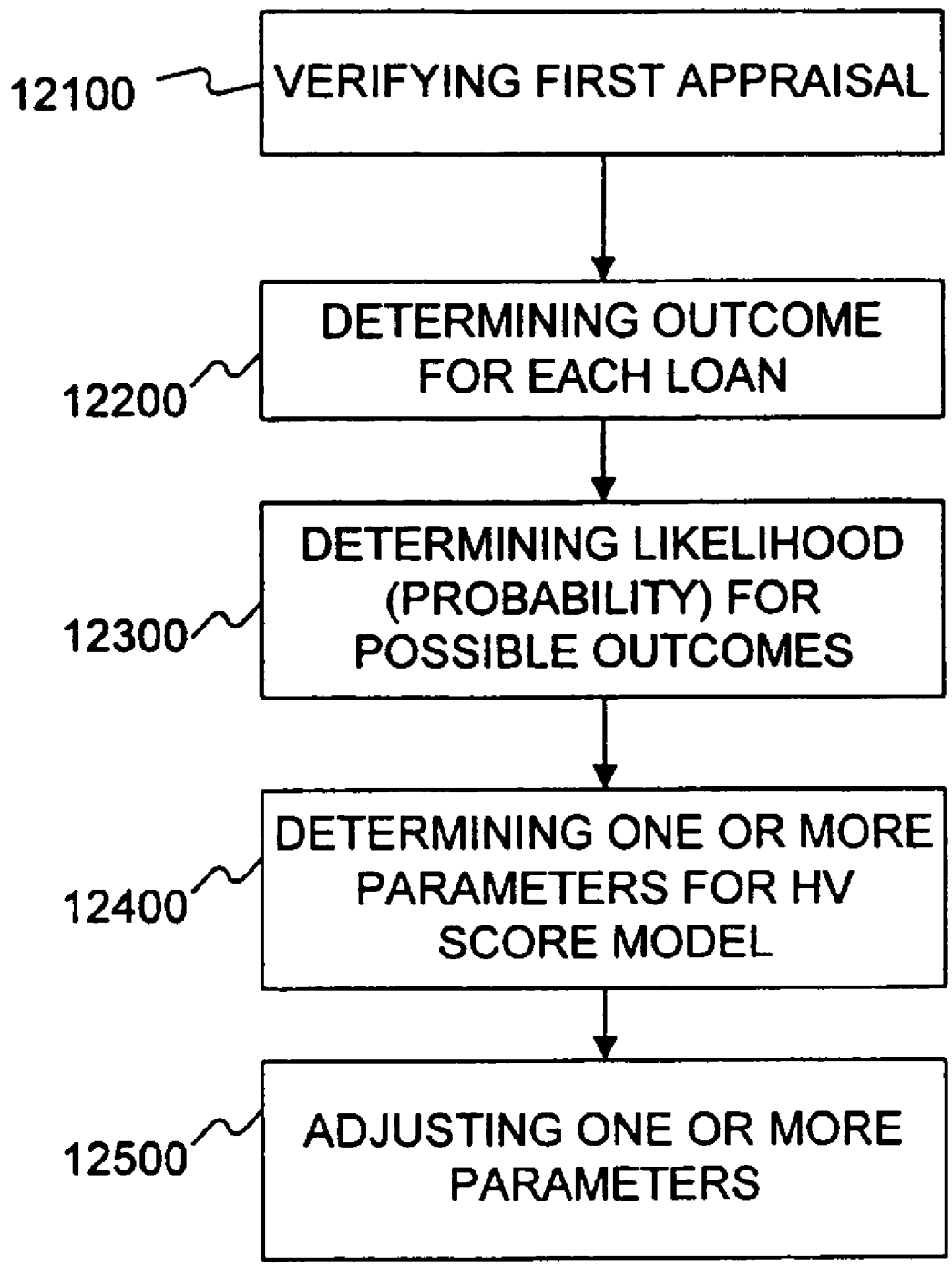
FIG. 12 is an exemplary flowchart for determining the one or more parameters (or coefficients) of the model consistent with the systems and methods of the present invention.

FIG. 12 shows an exemplary flow chart with steps for using a logistic regression approach. The logistic regression approach permits determining coefficients for the HV Score model based on historical information corresponding to one or more loans. Referring to FIG. 12, the computing platform 4300 may verify the first appraisal (step 12100); determine the outcome for each loan based on the historical information and the verification of the appraisal (step 12200); determine the likelihood (or probability) associated with each outcome (step 12300); determine one or more coefficients (or weights) for the HV Score model (step 12400); and adjust the one or more parameters by scaling the one or more coefficients (or the estimated log odds/probability) into a range (step 12500).

To verify the first appraisal (step 12100), the computing platform 4300 may compare the first appraisal with a second appraisal. Based on the comparison, the computing platform 4300 may verify whether the first appraisal is valid. For example, if the second appraisal is lower than the first appraisal, the first appraisal may be considered invalid. On the other hand, a second appraisal that is equal to or greater than the first appraisal may be considered valid. This second appraisal may be an in-person-appraisal, an AVM appraisal (or estimate), a comparison with comparable recent sales, and/or any other appraisal of the property value. FIG. 13 shows an exemplary table showing received historical information for loans with a second appraisal (shown as a "verified appraisal"). In this example, the computing platform 4300 may request a second appraisal for each of the mortgage loans listed in FIG. 13 by either requesting an in-person appraisal or requesting an AVM appraisal.

To determine the outcome for each mortgage loan (step 12200), the computing platform 4300 may compare the second appraisal to the first appraisal. If the second appraisal is lower than the first appraisal, the computing platform 4300 may set the outcome to a "1." An outcome of "1" may suggest that the first appraisal is faulty. On the other hand, if the second appraisal is equal to or greater than the first appraisal, the computing platform 4300 may set the outcome to "0." An outcome of "0" may suggest that the first appraisal is likely to be true. Referring again to FIG. 13, the computing platform 4300 thus processes each loan to determine an outcome based on the first appraisal and the verified second appraisal, storing the information depicted in FIG. 13 in the database 4600.

FIG. 13 also depicts a loan number, a first appraisal value, a verified appraisal value, an outcome, a loan-to-value ratio, a P factor (see below), credit information (e.g., a credit score or history), a condominium flag, and a cash out refinance flag. A skilled artisan would recognize that additional information may also be received by the computing platform 4300 to determine the coefficients of the HV Score model including any other information that provides an indication of an appraisal being faulty. For example, the additional information may correspond to the variables listed in Table 2.

The loan-to-value shown in FIG. 13 is the ratio of the loan amount to the fair market value of the property multiplied by 100. The P Factor may be determined based on the following equation:

$$P \text{ Factor} = \frac{\text{LOG (appraisal value}/AVM \text{ value)}}{AVM \text{ standard deviation}} \quad \text{Equation 3}$$

where LOG represents the natural logarithm; the appraisal value represents the first appraisal; the AVM value represents an appraisal value provided by an AVM; and the AVM standard deviation represents the standard deviation of the appraisal values provided by the AVM, such as HVE.

To determine the likelihood for each of the possible outcomes (step 12300), the computing platform 4300 may further process the historical information, using a logistic regression, to determine the odds that an outcome is possible. For example, the computing platform 4300 may determine the likelihood that an appraisal value is faulty given its loan-to-value, first appraisal, verified appraisal, loan-to-value ratio, P-Factor, credit score, condominium flag, and cash out refinance flag.

In one embodiment, the computing platform 4300 uses the following equation to determine the odds, or likelihood that an outcome, such as a faulty appraisal, is possible:

$$\text{Log}(p/1-p)) = a + b_1(LTV) + \quad \text{Equation 4}$$
$$b_2(P \text{ Factor}) + b_3(\text{Credit Score}) + b_4(\text{Condo Flag}) +$$
$$b_5(\text{Cash Out Refinance Flag}) + \ldots b_n(n^{th} \text{ Variable})$$

where $\text{Log}(p/(1-p))$ represents the log odds (also referred to as LOGIT) that the appraisal value is likely to be faulty; p represents the probability of a loan having a "0" outcome (or a "1" outcome); a, $b_1$, $b_2$, ... $b_n$ represent the initial coefficients of the HV Score model; and n represents the number of coefficients used in the HV Score model, where $b_n$ represents the $n^{th}$ coefficient. Before the computing platform 4300 utilizes a logistic regression, the values of a, $b_1$, $b_2$, ... $b_n$, and p may be unknown.

In this example, the computing platform 1500 uses five coefficients (i.e., n=5) corresponding to the following five variables: LTV, P factor, credit score, condo flag, and cash out refinance flag. Although this example uses five coefficients, a skilled artisan would recognize that additional coefficients and corresponding variables may be used instead.

Although p is an unknown value at the start of the logistic regression, p may conform to the following equation:

$$p=1/(1+e^\tau) \quad \text{Equation 5}$$

where τ is the following:

$$\tau = a + b_1^* LTV + b_2^* P \text{ Factor} + \quad \text{Equation 6}$$
$$b_3^* \text{ Credit Score} + b_4^* \text{ Condo Flag} +$$
$$b_5^* \text{ Cash Out Refinance Flag} + \ldots b_n^* \text{ Other variable}(s).$$

The computing platform 4300 may then determine an estimate of the coefficients of the HV Score model (step 12400). That is, the computing platform 4300 may solve for an estimate of a, $b_1$, $b_2$ ... $b_n$ using equations 4-6.

Although the computing platform 4300 may utilize a logistic regression approach as described in this example, a skilled artisan would recognize that any other approach may be used instead to determine the coefficients, such as the Probit regression approach available from SAS Institute Inc., standard regression, neural networks, and any other statistical or quantitative approach that may provide coefficients based on historical information (or "truth" data).

Referring again to FIG. 12, to adjust the one or more parameters (step 12500), the computing platform 1500 may then scale the coefficients a, $b_1$, $b_2$, . . . $b_n$. In one embodiment, the computing platform 4300 may scale the coefficients by multiplying each coefficient by the following equation:

$$\text{actual coefficient} = \text{initial coefficient} * (60/\ln(2)) \quad \text{Equation 7}$$

where ln is a natural logarithm. By using equation 7, the computing platform 1500 may scale the initial coefficients such that every 60 HV Score points doubles the odds that an appraisal is likely to be faulty. The scaled coefficients may be used as the actual coefficients used in the HV Score model, such as the HV Score model illustrated in FIG. 9. Accordingly, the computing platform 4300 may determine one or more coefficients for the HV Score model based on a logistic regression approach using historical (or "truth") information. The computing platform 4300 may then use the HV Score model to determine the HV Score.

Forecast Data Repository Embodiment

Figure 14:
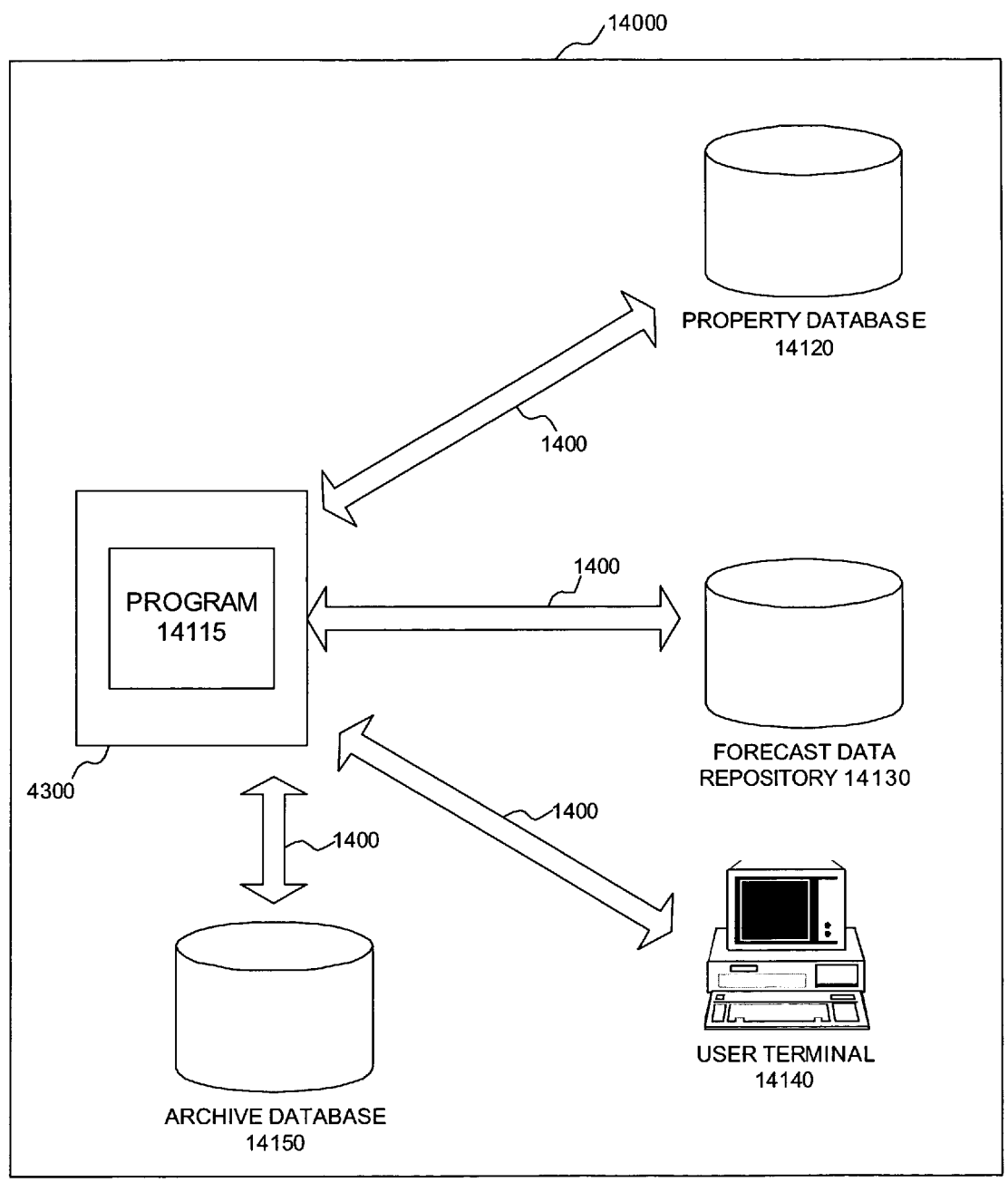
FIG. 14 shows another exemplary system environment consistent with the systems and methods of the present invention.

FIG. 14 shows a block diagram of a system consistent with an embodiment of the present invention. System 14000 includes a computing platform 4300 with program code 14115, a property database 14120, a forecast data repository 14130, an archive database 14150, a user terminal 14140, and communication channels 1400. System 14000 functions to provide historical (or "as of") property value estimates using only information as of the requested date.

System 14000 accesses, from property database 14120, an address batch that represents property data of a portion of the entire country. System 14000 also provides the property addresses and related data for various statistical models, so that program 14115 may compute a current automated valuation model (AVM) estimate of property values. A description of AVMs and related property databases and statistical models may be found in the above referenced applications, such as U.S. application Ser. Nos. 09/115,831, 09/134,161, 08/730,289 and 09/728,061. One of ordinary skill in the art may use any one or a combination of methods to compute the property value estimates without departing from the spirit of this invention. Regardless of what method or a combination of methods are used, the current property value estimates are stored in forecast data repository 14130, while as of estimates are stored in archive database 14150.

Computing platform 4300 may include a mainframe for managing property data and a UNIX machine for processing property data to compute AVM estimates. The mainframe may be an Amdahl processor primarily using tape storage in addition to having approximately 10 Gigabytes of DASD (Direct Access Storage Device). The UNIX-specific instructions may be executed on a Sun SPARC™ 1000e with the Solaris™ 2.5.1 operating system, three system boards, six CPUs, 768 Megabytes of memory, and 306 Gigabytes of disk space. One skilled in the art may, however, use any computing system with adequate processing and memory capabilities.

Alternatively, computing platform 4300 may include a UNIX machine for managing and processing the property data to compute property value estimates. The UNIX-specific instructions may be executed on a Sun Ultrasparc™ E6500 with the Solaris™ version 2.8 operation system, eight system boards, ten CPUs at 400 Megahertz, 10 Gigabytes of memory, and 2 Terabytes of usable disk storage. One skilled in the art may, however, use any computing system with adequate processing and memory capabilities. One of ordinary skill in the art will recognize that various computer platforms and operating systems could be used to implement the present invention, and that it is desirable to upgrade the computer system as equipment with increased capability becomes available.

Computing platform 4300 may also include program 14115 for controlling the overall process of computing platform 4300. Moreover, program 14115 may be written using such tools as COBOL II, SAS, and IBM utilities (Syncsort, JCL, FTP, etc.). To perform some standard functions, program 14115 may use various commercial software such as Group 1 (Code 1 Plus v1.5 and Demographics v2.7), MathSoft (S-Plus v3.4), and the SAS Institute (mainframe and UNIX v6.12).

Property database 14120 may store data representing property data and sales transaction data for use in computing the AVM property value estimate. The property database 14120 may be periodically updated with a batch of addresses that include property and sales data. Forecast data repository 14130 may store current AVM estimates, while archive database 14150 may store historical AVM estimates.

User terminal 14140 may be implemented as a dummy terminal or a personal computer connected to computing platform 4300. Through user terminal 14140, users can access preprocessed AVM property value estimates and/or receive HV scores for any given property at any given date, including the current date and the as-of date.

Program 14115 may compute the estimate of property values using statistical models, e.g., a repeat sales model and a hedonic model, and combines the results to produce the best AVM estimate. Other models may also be used to compute the AVM property estimates. An example of combining results of the statistical models is provided in the above-referenced related application Ser. No. 08/730,289. For explanatory purposes only, the described implementation will combine the property value estimates of a repeat sales model and a hedonic model. One skilled in the art may use any one or a combination of methods without departing from the spirit of this invention. Regardless of what model or a combination of models are used, the current AVM property value estimates are stored in forecast data repository 14130 for retrieval before the next predetermined update. One skilled in the art may also design a system to store the property value estimates in property database 14120, which stores the property data. As forecast data repository 14130 is created, values are added to archive database 14150, which serves to store historical information from forecast data repository 14130.

In one embodiment consistent with the present invention, before new AVM property value estimates are generated by periodic updating, the estimates contained in the superceded forecast data repository 14130 are archived in a database 14150. Alternatively, the forecast data repository 14130 is copied to archive database 14150 soon after new property value estimates are generated by periodic updating, so that both the forecast data repository 14130 and the archive database 14150 contain a copy of the current estimates. In another implementation, the entire contents of the current forecast data repository 14130 is not archived, but instead only selected data, such as each property's address, estimate value(s), and date of estimate, are archived. In this implementation, the archived data may be added to an existing table or other structure in database 14150 containing previously archived data.

In these implementations, the forecast data repository data are organized in the archive database 14150 according to the dates or time period that the archived forecast data repository covers, for example, Jan. 1, 1999, through Mar. 31, 1999. Thus, archived forecast data repository data is accessible by specifying a date within the range of dates that the forecast data repository covers. One of ordinary skill will recognize that archive database 14150 could be implemented in various ways without departing from the principles of the present invention. For example, archive database 14150 need not necessarily be on a separate storage device, but instead could be implemented on the same storage device as forecast data repository 14130 or property database 14120. As another example, one of ordinary skill will also recognize that archive database 14150 need not necessarily be a separate database, but instead could be integrated as a part of property database 14120 or forecast data repository 14130.

Figure 15:
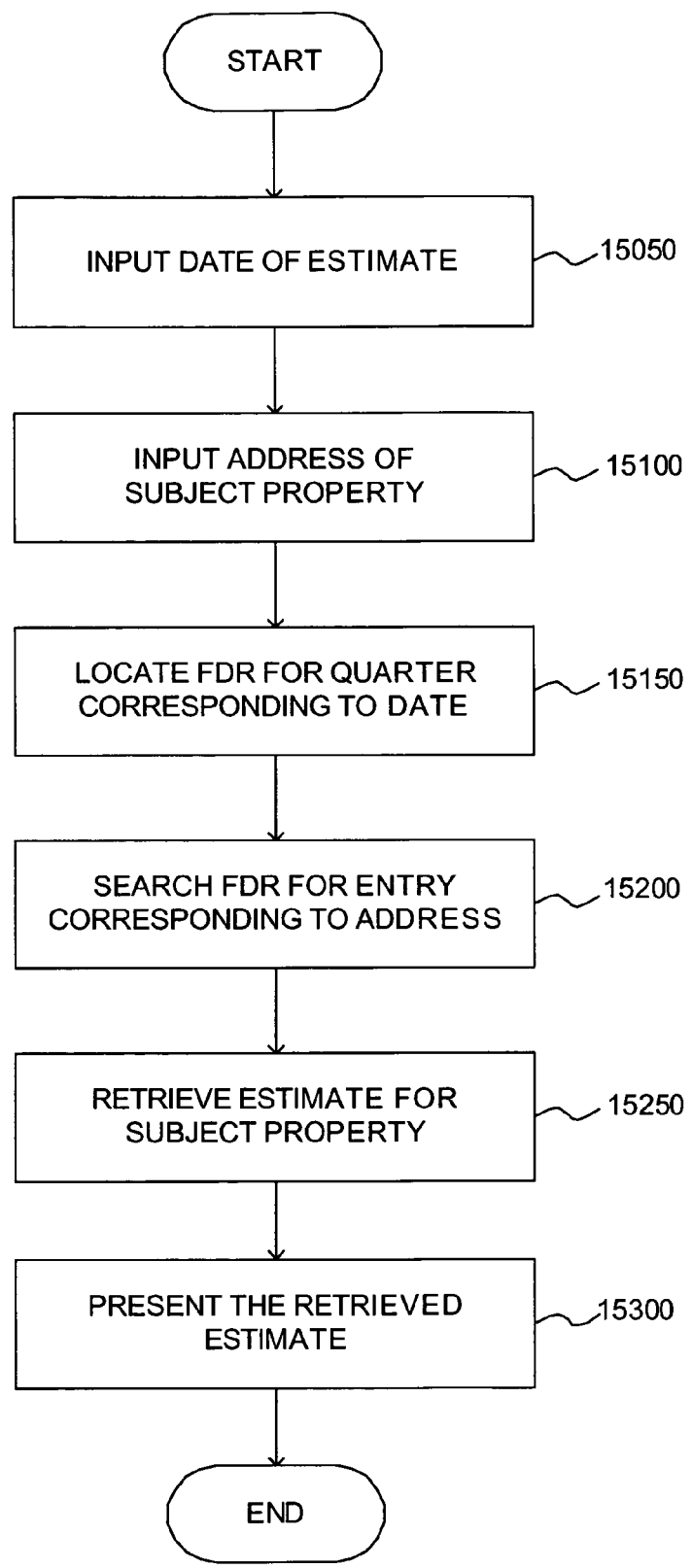
FIG. 15 is an exemplary flowchart illustrating a process for determining a property value estimate as of a user-specified date consistent with the systems and methods of the present invention.

FIG. 15 is a flowchart illustrating a process for determining an AVM property value estimate as of a user-specified past date consistent with the principles of the present invention. As shown in FIG. 15, at the beginning of the process, a user inputs the date for which an AVM estimate is desired, for example, a mortgage loan origination date (step 15050). Next, the user inputs the address of the subject property for which the AVM estimate is desired, for example, the address of the property that secures the mortgage loan (step 15100). One of ordinary skill will recognize that the date and address could be specified a vast number of ways without departing from the principles of the present invention. For instance, the input data could be specified by a computer file containing the mortgage loan origination dates and subject property addresses corresponding to each loan in a portfolio of 1,000 loans that a financial institution is evaluating for purchase.

In step 15150, the archived forecast data repository (FDR) data corresponding to the entered date is located. For example, if forecast data repositories are archived every three months, then the repository data for the three months containing the loan origination date entered in step 15050 is located. Next, the located forecast data repository data is searched for an entry corresponding to the address of the subject property entered in step 15100 (step 15200). When the proper entry is found, the price estimate(s) for the subject property as of the entered date is retrieved from the forecast data repository archive (step 15250). One of ordinary skill will recognize that the forecast data repository data could be organized and accessed in a vast number of ways without departing from the principles of the present invention. For instance, entire forecast data repositories could be stored, or just the date, address, and historical estimate(s) may be archived. The archived data could be organized into a single table indexed by property address and estimate date range or in multiple tables, one for each date range. One of ordinary skill will realize that in a single-table implementation, the past estimate corresponding to the address and target date could be retrieved using a simple table lookup.

Finally, the process presents the retrieved estimate to the user (step 15300). Again, one of ordinary skill will recognize that the retrieved estimate could be presented in a vast number of ways without departing from the principles of the present invention. For instance, the estimate could be displayed on a screen or added to a computer file or database that contains similar estimates corresponding to each loan in a portfolio of 1,000 loans that a financial institution is considering purchasing. In another example, the estimate could be piped as input to an application program for further processing.

Additional systems and methods consistent with the principles of the present invention may rely on an accurate AVM property value estimate as of a past date to evaluate various transactions, functions, and entities involving the subject property. For example, a financial institution that owns the mortgage loan associated with a subject property, such as the loan originator or a secondary-market purchaser of the loan, may use an independent contemporaneous estimate to perform a quality control review of the loan's quality at the time of its origination. The degree of quality of a mortgage loan is based in no small part on the accuracy of the assessed value of the underlying property. Thus, to fairly determine the loan's quality at the time of its origination, a fair and accurate independent estimate of the underlying property's value at the time of origination is needed for comparison purposes. If the independent estimate is biased by the influence of information available only after the origination date (information which was unknowable at the time the loan was made and which may reflect changes in the condition of the property subsequent to loan origination), then the independent estimate may not serve as a fair or accurate basis for comparison.

Starting with a comparison of an accurate, independent, contemporaneous estimate to the actual original estimate or assessment used to originate a loan (or for some other transaction based at least in part on the value of the subject property), a financial institution (or other party) can improve its business practices and achieve quality control goals. For example, a loan owner can accurately evaluate a loan for possible appraisal inflation or outright appraisal fraud and flag the loan for a further formal appraisal review process. This is especially important for non-performing loans, i.e., loans in default, because if fraud is found the current loan owner may be able to recover some of the non-performing loan losses from the fraud perpetrator. Applied on a larger scale, accurately determining the degree of quality of the original appraisals for a large portfolio of loans enables a financial institution to more accurately evaluate the degree of credit-related risk associated with loan default for the entire portfolio. Specifically, if comparison of the original appraised property values with accurate contemporaneous estimates reveals that a portfolio's securing properties were worth significantly less than the original appraisals indicated, then the portfolio owner has a greater risk of losing money when defaults occur because foreclosure sales of the properties would generate less money than indicated by the original appraisals. With an accurate idea of the degree of default risk for a portfolio of loans, a financial institution can better negotiate the portfolio purchase price or even avoid purchasing the portfolio or individual loans therein. In a related application, a financial institution can use accurate as-of-date estimates to perform targeted appraisal reviews on performing loans that it already owns and discover unknown risk prior to the loans becoming non-performing. For instance, if the loans are found to be riskier than indicated by the original appraisals, the financial institution could implement hedging strategies to offset expected default losses, such as purchasing Guarantee Certificates as described in U.S. patent application Ser. No. 09/602,254, assigned to Freddie Mac. As another example, the financial institution may acquire insurance, indemnification, or a partial refund from the entity that sold the loans. Conversely, the financial institution may avoid paying for unnecessary hedges if the comparison indicates that the loans are safer than expected and deserve a high degree of confidence.

In yet another application, comparison of original estimates with accurate as-of-date estimates allow secured loan holders to identify origination lenders who have delivered loans with high quality appraisals, and corresponding lower default-related risk, during the course of business. Similarly, lenders who have delivered loans with low quality appraisals are also identified. With this quality pattern information, a financial institution or other secured loan purchaser can better choose which lenders to purchase loans from, better negotiate loan purchase prices, and negotiate indemnification for past purchases from low-quality lenders.

Figure 16:
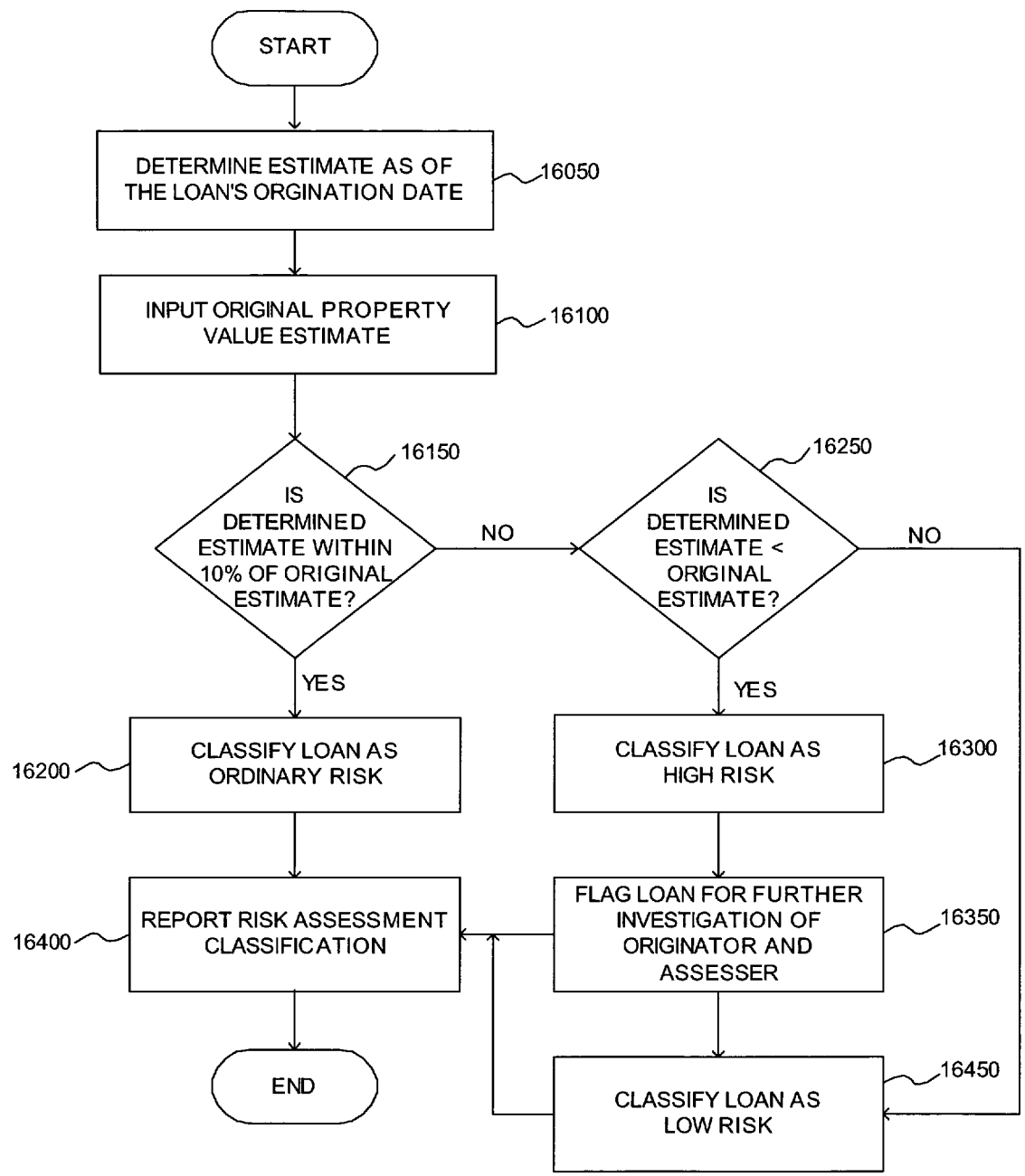
FIG. 16 is an exemplary flowchart illustrating the use of a property value estimate as of a date to classify a loan's original property value estimate consistent with the systems and methods of the present invention.

FIG. 16 is a flowchart illustrating a process that uses a property value estimate as of a user-specified past date to classify a loan's original property value estimate. First, the process involves determining an independent property value estimate as of the loan origination date (step 16050). In one implementation consistent with the principles of the present invention, this determination is made using a process similar to the process shown in FIG. 15. Next, the original property value estimate used as part of the loan origination process is input (step 16100). One of ordinary skill in the art will recognize that the input data could be specified a vast number of ways without departing from the principles of the present invention. For instance, in an implementation that uses a computer to perform the process, the original property value estimate could be read by a human from the loan origination papers and typed in. As another example, it could be part of a read-in computer file containing loan information, including the original property value estimate, corresponding to each loan in a portfolio of 1,000 loans.

The process also involves comparing the as-of-date estimate (from step 16050) to the original estimate (from step 16100) and determining whether the two estimates are within ten percent of each other (step 16150). If the as-of-date estimate and the original estimate are within ten percent of each other, then the process classifies the associated loan as having an ordinary degree of risk (step 16200), reports the risk assessment classification (step 16400), and ends. One of ordinary skill will recognize that the threshold risk classification value of ten percent used in this example could be set higher or lower, or adjusted dynamically, without departing from the principles of the present invention. For instance, the step 16150 threshold for classification as an ordinary risk load could be set at five percent or fifteen percent.

Referring again to step 16150, if the as-of-date estimate and the original estimate are not within ten percent of each other, then a determination is made as to whether the as-of-date estimate is less than the original property value estimate (step 16250). If so, (i.e., the original property value estimate is more than ten percent higher than the as-of-date estimate), then the process classifies the loan as having a high degree of risk (step 16300), flags the loan for investigation of the originator and original assessor (step 16350), reports the risk assessment classification (step 16400), and ends. One of ordinary skill will realize that the numerous other actions could be taken instead of, or in addition to, flagging the high-risk loan for investigation without departing from the principles of the present invention. For instance, if the loan was part of a portfolio of loans being offered for sale, the loan could be excluded from the portfolio because the buyer does not wish to purchase high-risk loans. In another example, the assessor who made the original over-inflated property value estimate could be identified, and then other loans that originally utilized the same assessor could be selectively chosen for closer scrutiny. In yet another example, the originating lender who made the mortgage loan based on the original over-inflated property value estimate could be identified, contacted, and asked to indemnify the current loan holder against losses up to a limit based on the difference in the estimates. Referring again to step 16250, if the as-of-date estimate is greater than the original estimate, then the loan is classified as having a low degree of risk (step 16450), the risk assessment classification is reported (step 16400), and the process ends. One of ordinary skill will realize that reporting the risk assessment classification could be done in myriad ways without departing from the principles of the present invention. For instance, the classification may simply be displayed to a user on a computer screen, who then makes decisions based on the classification that improve business or help achieve quality control goals. In another example, the classification may be written to a database according to loan identification information such as property address and date. Alternatively, the classification may be reported by digitally transmitting it to an application program that uses it to evaluate various transactions and functions involving the subject property. In addition, one of ordinary skill will realize that more or fewer than three risk classifications could be used without departing from the principles of the present invention.

Instead of using a percentage difference between the as-of-date estimate and the original estimate, in one embodiment, the HV score is determined. The HV Score may serve as an indication that the original estimate of property value was faulty.

The systems herein may be embodied in various forms including, for example, a data processor, such as the computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include for example machine code, such as produced by a compiler, and files containing a high level code that can be executed by the computer using an interpreter.

Furthermore, although the embodiments above refer to processing information related to mortgage loans secured by improved real property, systems and methods consistent with the present invention may process information related to other types of loans or credit instruments, including those secured by property, such as automobiles and/or personal property. Moreover, although reference is made herein to using the HV Score to assess a residential property for a mortgage loan, in its broadest sense systems and methods consistent with the present invention may provide a score for any type of property including commercial property.

What is claimed is:

1. A computer-implemented method for providing an automated value estimate of a property as of a previous time period, the computer-implemented method comprising the steps performed by a computer of:

determining historical valuation data reflecting automated value estimates of properties, the automated value estimates corresponding to values of the properties during a plurality of previous time periods;

storing the historical valuation data in a database;

receiving a request for an automated value estimate of a property as of a specified one of the previous time periods, the request identifying the property and the specified one of the previous time periods;

searching the database for the historical valuation data of the property identified by the request;

retrieving the historical valuation data from the database reflecting the automated value estimate of the property during the specified one of the previous time periods; and providing, in response to the request, the automated value estimate of the property as of the specified one of the previous time periods.

2. The computer-implemented method according to claim 1, further comprising:

determining whether an appraisal value of the property during the specified time period accurately reflected the value of the property during the specified time period.

3. The computer-implemented method according to claim 2, wherein determining whether the appraisal value accurately reflected the value of the property comprises:

comparing the automated value estimate of the property with the appraisal value.

4. The computer-implemented method according to claim 2, wherein determining whether the appraisal value accurately reflected the value of the property comprises:

receiving loan data corresponding to a loan used to purchase the property; and determining a score based on the loan data, the score reflecting whether the appraisal value was faulty as of the specified time period.

5. The computer-implemented method according to claim 1, further comprising using an automated valuation model to determine the historical valuation data.

6. The computer-implemented method according to claim 5, wherein the historical valuation data is:

generated by the automated valuation model contemporaneously with the previous time periods, and stored in the database as the historical valuation data is determined by the automated valuation model.

7. A system for providing an automated value estimate of a property as of a previous time period, the system comprising:

at least one memory comprising computer-executable instructions to:

determine historical valuation data reflecting automated value estimates of properties, the automated value estimates corresponding to values of the properties during a plurality of previous time periods;

store the historical valuation data in a database;

receive a request for an automated value estimate of a property as of one specified previous time period from among the previous time periods, the request identifying the property and the one specified previous time period;

search the database for the historical valuation data of the property identified by the request;

retrieve the historical valuation data from the database reflecting the automated value estimate of the property during the one specified previous time period; and provide, in response to the request, the automated value estimate of the property as of the one specified previous time period, and at least one data processor that executes the instructions.

8. The system according to claim 7, wherein the instructions are further configured to:

determine whether an appraisal value of the property during the specified time period accurately reflected the value of the property during the specified time period.

9. The system according to claim 8, wherein the instructions configured to determine whether the appraisal value accurately reflected the value of the property are further configured to:

compare the automated value estimate of the property with the appraisal value.

10. The system according to claim 8, wherein the instructions configured to determine whether the appraisal value accurately reflected the value of the property are further configured to:

receive loan data corresponding to a loan used to purchase the property; and determine a score based on the loan data, the score reflecting whether the appraisal value was faulty as of the specified time period.

11. The system according to claim 7, further comprising instructions configured to use an automated valuation model to determine the historical valuation data.

12. The system according to claim 11, wherein the historical valuation data is:

generated by the automated valuation model contemporaneously with the previous time periods, and stored in the database as the historical valuation data is determined by the automated valuation model.

13. A computer-readable medium comprising computer-executable code for causing a processor to execute a method for providing an automated value estimate of a property as of a previous time period, the method comprising:

determining historical valuation data reflecting automated value estimates of properties, the automated value estimates corresponding to values of the properties during a plurality of previous time periods;

storing the historical valuation data in a database;

receiving a request for an automated value estimate of a property as of a specified one of the previous time periods, the request identifying the property and the specified one of the previous time periods;

searching the database for the historical valuation data of the property identified by the request;

retrieving the historical valuation data from the database reflecting the automated value estimate of the property during the specified one of the previous time periods; and providing, in response to the request, the automated value estimate of the property as of the specified one of the previous time periods.

14. The computer-readable medium according to claim 13, the method further comprising:

determining whether an appraisal value of the property during the specified time period accurately reflected the value of the property during the specified time period.

15. The computer-readable medium according to claim 14, wherein determining whether the appraisal value accurately reflected the value of the property comprises:
    comparing the automated value estimate of the property with the appraisal value.

16. The computer-readable medium according to claim 14, wherein determining whether the appraisal value accurately reflected the value of the property comprises:
    receiving loan data corresponding to a loan used to purchase the property; and
    determining a score based on the loan data, the score reflecting whether the appraisal value was faulty as of the specified time period.

17. The computer-readable medium according to claim 13, the method further comprising using an automated valuation model to determine the historical valuation data.

18. The computer-readable medium according to claim 17, wherein the historical valuation data is:
    generated by the automated valuation model contemporaneously with the previous time periods; and
    stored in the database as the historical valuation data is determined by the automated valuation model.

* * * * *